United States Patent [19]

Inoue et al.

[11] Patent Number: 5,557,361
[45] Date of Patent: Sep. 17, 1996

[54] DEVICE FOR SETTING CAMERA INFORMATION USING A REDUCED NUMBER OF OPERATING MEMBERS

[75] Inventors: Yoshiharu Inoue; Kimio Uematsu, both of Tokyo, Japan

[73] Assignee: Nikon Corporation, Tokyo, Japan

[21] Appl. No.: 524,690

[22] Filed: Sep. 7, 1995

[30] Foreign Application Priority Data

Sep. 7, 1994 [JP] Japan ................................ 6-214082

[51] Int. Cl.⁶ ........................... G03B 17/00; G03B 17/18; G03B 15/03
[52] U.S. Cl. ................. 354/289.1; 354/289.12; 354/475; 354/145.1
[58] Field of Search ..................... 354/289.1, 289.11, 354/289.12, 471, 475, 145.1

[56] References Cited

U.S. PATENT DOCUMENTS

| | | | |
|---|---|---|---|
| 5,005,033 | 4/1991 | Miyasaka | 354/289.1 |
| 5,164,760 | 11/1992 | Fujino et al. | 354/289.12 |
| 5,189,466 | 2/1993 | Yasukawa et al. | 354/289.12 |
| 5,291,236 | 3/1994 | Ohsawa et al. | 354/289.12 |
| 5,298,936 | 3/1994 | Akitake et al. | 354/471 |

*Primary Examiner*—Michael L. Gellner
*Assistant Examiner*—Eddie C. Lee

[57] ABSTRACT

A setting device to set camera data, including a first operating member, a first setting input device which is switched ON when the first operating member is operated, a second operating member, a second setting input device which is switched ON when the second operating member is operated, a third operating member, and a third setting input device which outputs a signal according to an operation of the third operating member. A first memory stores first setting data, and a second memory to stores second setting data. A third memory stores one of a first state which selects the first setting data and a second state which selects the second setting data. A first display displays one of the first and second setting data, according to the state stored by the third memory. A second display displays one of the first setting data stored in the first memory and the second setting data stored in the second memory, according to the content of the third memory. A first control unit changes a state stored in the third memory according to an output signal of the third setting input device when the first setting input device is ON. A second control unit changes the content of the first memory, when the third memory stores the first state, according to the output signal of the third setting device when the second setting input device is ON. A third control unit changes the content of the second memory, when the third memory stores the second state, according to the output signal of the third setting device when the second setting input device is ON.

5 Claims, 35 Drawing Sheets

FIG. 19

| Flag | 0 | 1 |
|---|---|---|
| _BUTTON_A | operating button A depressed | operating button A not depressed |
| _BUTTON_B | operating button B depressed | operating button B not depressed |

FIG. 20

| DCMODE | |
|---|---|
| 0 | normal control |
| 1 | function selection |
| 2 | setting standby |
| 3 | function setting |
| 4 | self setting |

FIG. 21

| FCMODE | |
|---|---|
| 0 | film sensitivity setting |
| 1 | forwarding mode |
| 2 | AF mode |
| 3 | exposure mode |
| 4 | photometric mode |
| 5 | synchro mode |
| 6 | light regulation correction |
| 7 | exposure correction |
| 8 | exposure bracketing |
| 9 | light regulation bracketing |

FIG. 22A

| ISOMODE | |
|---|---|
| 0 | automatic readout setting |
| 1 | ISO 6 |
| 2 | ISO 8 |

FIG. 22B

| 3 | ISO 10 |
|---|---|
| --- | --- |
| 28 | ISO 6400 |

FIG. 23

| QSMODE | |
|---|---|
| 0 | synchro mode |
| 1 | low speed continuous windup mode |
| 2 | high speed continuous windup mode |
| 3 | silent mode |

FIG. 24

| AFMODE | |
|---|---|
| 0 | single servo mode |
| 1 | continuous servo mode |
| 2 | manual focus mode |

FIG. 25

| AEMODE | |
|---|---|
| 0 | program mode |
| 1 | shutter priority mode |
| 2 | aperture priority mode |
| 3 | manual mode |

FIG. 26

| AMPMODE | |
|---|---|
| 0 | 8 division evaluation photometric mode |
| 1 | center priority photometric mode |
| 2 | sports photometric mode |

FIG. 27

| SYNCMODE | |
|---|---|
| 0 | normal mode |
| 1 | red eye reduction effect mode |
| 2 | slow synchro mode |
| 3 | rear blind slow synchro mode |

FIG. 28

| AEHS | |
|---|---|
| -15 | -5 ev |
| -14 | -4.7 ev |
| --- | --- |
| -1 | -0.3 ev |
| 0 | 0 ev |
| 1 | +0.3 ev |
| --- | --- |
| 14 | +4.7 ev |
| 15 | +5 ev |

FIG. 29

| SBHS | |
|---|---|
| -3 | -1 ev |
| -2 | -0.7 ev |
| -1 | -0.3 ev |
| 0 | 0 |
| 1 | +0.3 ev |
| --- | --- |
| 8 | +2.7 ev |
| 9 | +3 ev |

FIG. 30

| Flag | 0 | 1 |
|---|---|---|
| _BKTMODE | select AEBKT | select SBBKT |
| _BKT | no BKT | do BKT |

1

DEVICE FOR SETTING CAMERA INFORMATION USING A REDUCED NUMBER OF OPERATING MEMBERS

BACKGROUND OF THE INVENTION

1. Field of the Invention

The present invention relates to a camera having plural operating members for setting camera data, and, more particularly, the present invention relates to a camera which effects data setting operations using a reduced number of operating members.

2. Description of the Related Art

Various mechanisms for setting data in cameras are known. Such mechanisms include operating buttons which are depressed to set various data corresponding to the respective operating buttons, or rotary operating members which are rotated to generate signals in response to the rotation to change the set data. However, because of the increasing complexity of cameras, a large amount of data is required to be set for camera operations. Accordingly, it is necessary to provide plural operating members for numerous camera functions, resulting in the disadvantage of increased cost and difficulty for the user to memorize the arrangement and functions of the respective operating members. Furthermore, when the user is unfamiliar with the functions of the many operating members, the operating members may be set without effect, or erroneous setting operations often result. Therefore, simplification of the design of the operating members is necessary for the operator to memorize the functions of the operating members.

SUMMARY OF THE INVENTION

It is an object of the present invention to provide a data setting device for a camera having a reduced number of operating members.

Objects and advantages of the present invention are achieved with a setting device to set camera data. The setting device includes a first operating member, a first setting input device which is switched ON when the first operating member is operated, a second operating member, a second setting input device which is switch ON when the second operating member is operated, a third operating member, and a third setting input device which outputs a signal according to an operation of the third operating member. A first memory stores first setting data, and a second memory stores second setting data. A third memory stores one of a first state which selects the first setting data and a second state which selects the second setting data. A first display displays one of the first and second setting data, according to the state stored by the third memory. A second display displays one of the first setting data stored in the first memory and the second setting data stored in the second memory, according to the content of the third memory. A first control unit changes a state stored in the third memory according to an output signal of the third setting input device when the first setting input device is ON. A second control unit changes the content of the first memory, when the third memory stores the first state, according to the output signal of the third setting device when the second setting input device is ON. A third control unit changes the content of the second memory, when the third memory stores the second state, according to the output signal of the third setting device when the second setting input device is ON.

Objects and advantages of the present invention are also achieved with a camera having a setting device to set camera data, the setting device including a first operating member, a first setting input device which is switched ON when the first operating member is operated, a second setting input device which is switched ON when the second operating member is operated, a third operating member, and a third setting input device which outputs a signal according to an operation of the third operating member. A first memory stores first setting data, and a second memory stores second setting data. A third memory stores one of a first state which selects the first setting data and a second state which selects the second setting data. A first display displays one of the first and second setting data selected according to the state stored by the third memory. A second display displays one of the first setting data stored in the first memory and the second setting data stored in the second memory according to the state stored by the third memory. A fourth memory having first, second, third and fourth memory states is also provided. A first control device, when the fourth memory is in the first memory state, changes the content of the fourth memory to the second memory state when the first setting input device is ON, and when the fourth memory is in the second memory state, changes the content of the fourth memory to the third memory state when the first setting input device is OFF, and when the fourth memory is in one of the second memory state and the third memory state, changes the content of the fourth memory to the fourth memory state when the second setting input device is ON, and when the fourth memory is in the fourth memory state, and the second setting input device is OFF, changes the content of the fourth memory to the first memory state. A second control device, when the fourth memory is in the second memory state, changes the content of the third memory according to the output of the third setting input device, and when the fourth memory is in the fourth state, changes the content of the first memory when the third memory is in the first setting state, and causes the content of the second memory to change when the third memory is in the second setting state.

The data setting device further includes a timer to time a predetermined time from when the fourth memory changes from the fourth memory state to the first memory state, and a third control device which sets the fourth memory to the fourth memory state when the second setting input device is ON and the timer is timing.

The data setting device further includes a flash generation device, an inhibiting device, and a flash device control. The first setting data is light regulation correction data of the flash generation device, and the inhibiting device makes the light regulation correction data invalid, and inhibits the change of the third memory to the first memory state when the flash device is not able to generate light.

The data setting device also includes a flash generation device, an inhibiting device, and a flash generation device control. The first setting data is light regulation bracketing data of a flash generation device, and the inhibiting device makes the second bracketing setting invalid and inhibits the change of the third memory to the first memory state when the flash generation device is not able to generate light.

BRIEF DESCRIPTION OF THE DRAWINGS

These and other objects and advantages of the present invention will become apparent and more readily appreciated from the following description of the preferred embodiments taken in conjunction with the accompanying drawings of which:

FIG. 19 is a table showing states of operating button data in accordance with embodiments of the present invention.

FIG. 20 is a table showing states of the variable DCMODE in accordance with embodiments of the present invention.

FIG. 21 is a table showing states of the variable FCMODE in accordance with embodiments of the present invention.

FIG. 22 is a table showing states of the variable ISO-MODE in accordance with embodiments of the present invention in accordance with embodiments of the present invention.

FIG. 23 is a table showing states of the variable QSMODE in accordance with embodiments of the present invention.

FIG. 24 is a table showing states of the variable AFMODE in accordance with embodiments of the present invention.

FIG. 25 is a table showing states of the variable AEMODE in accordance with embodiments of the present invention.

FIG. 26 is a table showing states of the variable AMPMODE in accordance with embodiments of the present invention.

FIG. 27 is a table showing states of the variable SYNCMODE in accordance with embodiments of the present invention.

FIG. 28 is a table showing states of the variable AEHS in accordance with embodiments of the present invention.

FIG. 29 is a table showing states of the variable SBHS in accordance with embodiments of the present invention.

FIG. 30 is a bracketing table in accordance with embodiments of the present invention.

DESCRIPTION OF THE PREFERRED EMBODIMENTS

Figure 1:
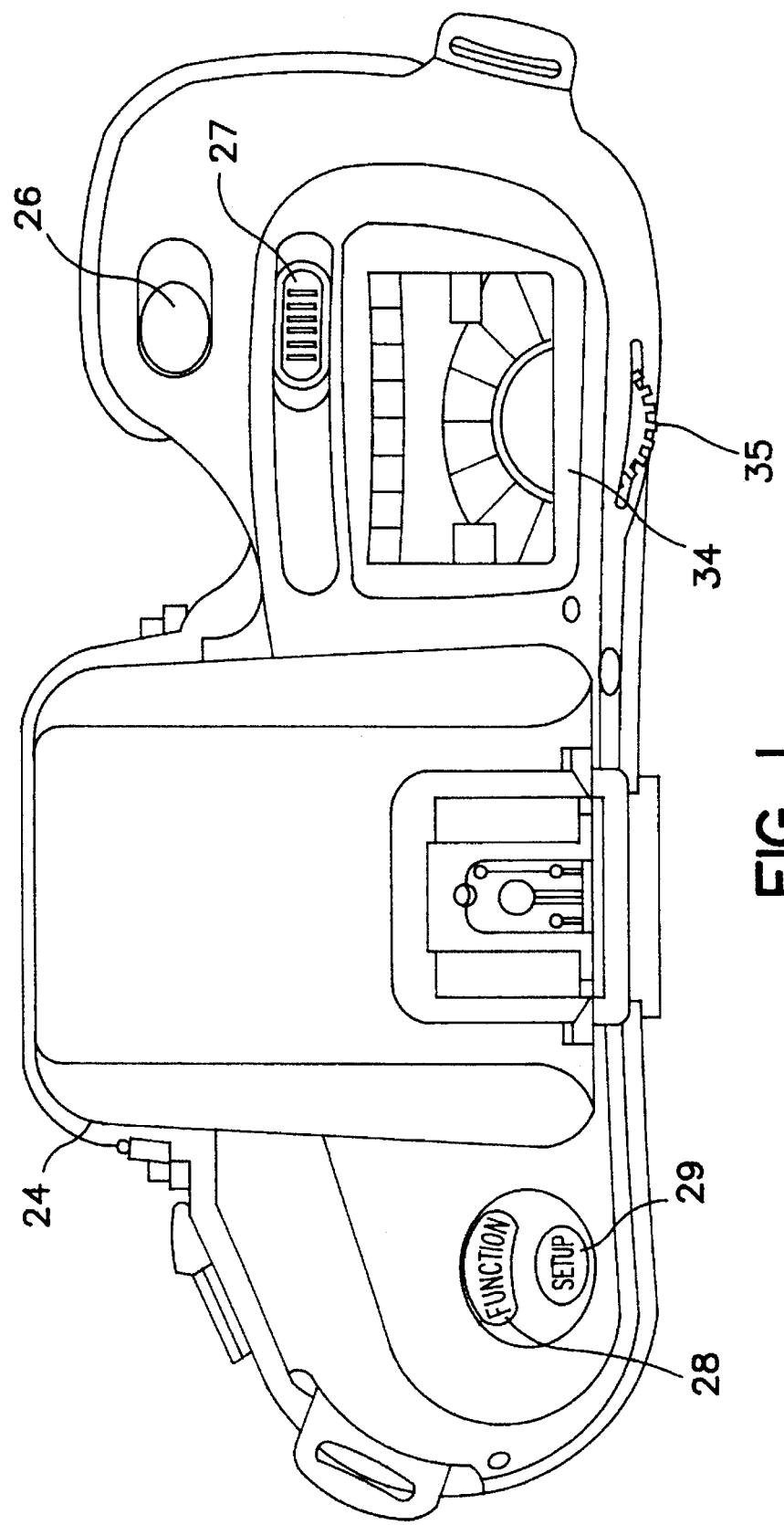
FIG. 1 is a top view of a camera body in accordance with embodiments of the present invention.

Reference will now be made in detail to the present preferred embodiments of the present invention, examples of which are illustrated in the accompanying drawings, wherein like reference numerals refer to like elements throughout.

FIG. 1 is a top view of a single lens reflex camera in accordance with a first embodiment of the present invention. Positioned on the top surface of the camera are an operating button 28 which controls camera function selection, an operating button 29 which controls camera function setting, and a command dial 35 which performs data setting changes. Further, a built-in strobe 24, a release button 26, a main switch 27, and a liquid crystal display unit (LCD) 34 for external display are located on the top surface of the camera.

Figure 2:
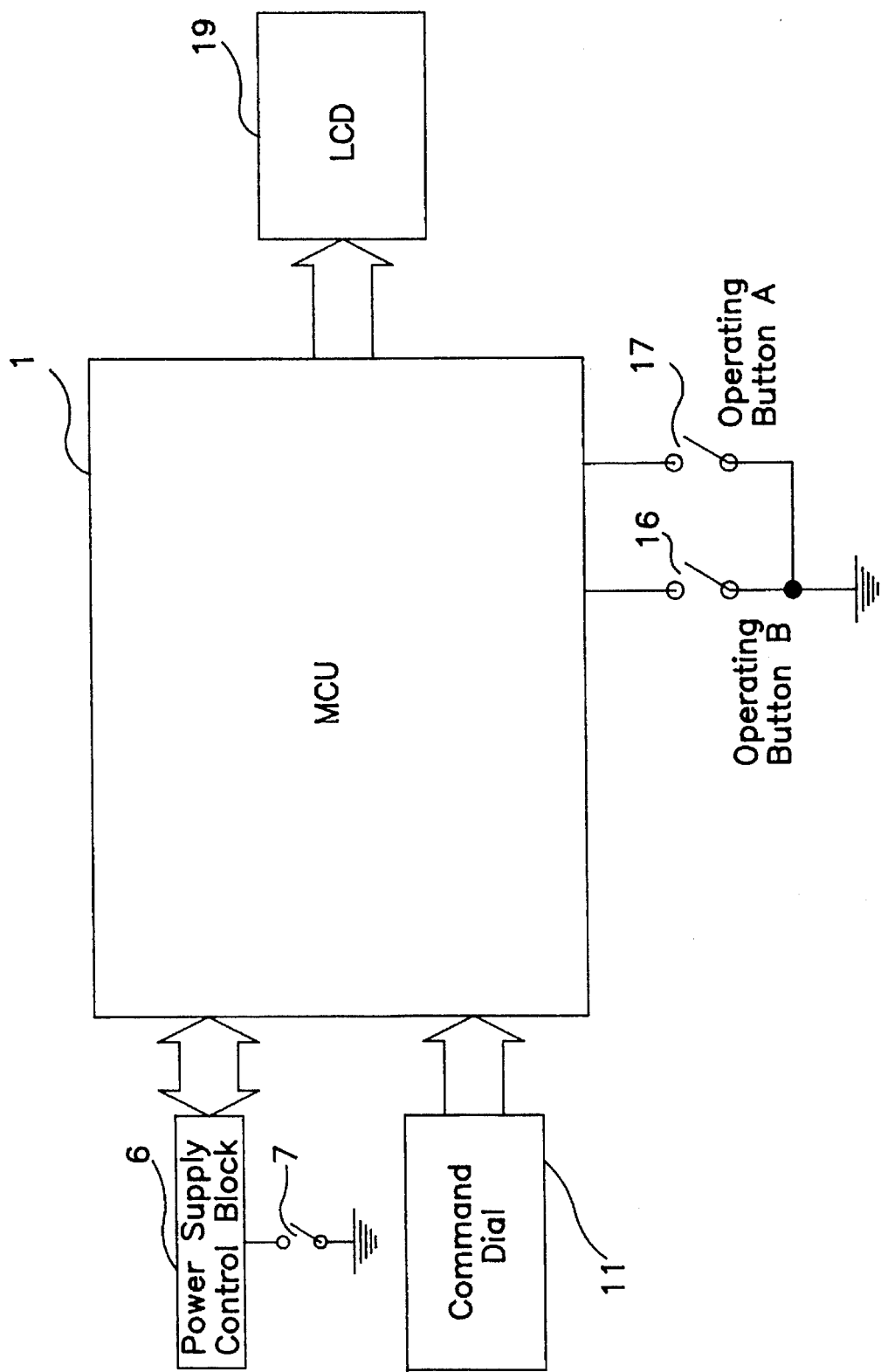
FIG. 2 is a block diagram of a camera control system in accordance with embodiments of the present invention.

FIG. 2 is a block diagram of the camera control circuitry in accordance with embodiments of the present invention. A microcomputer unit (MCU) 1 controls camera operations. The MCU 1 includes memory and performs functions such as a timer function. A power supply control unit 6 supplies power to the MCU 1. A switch 7 is connected to the power supply control unit 6 and, when the switch 7 is ON, power is supplied to the MCU 1 from the power supply control unit 6. A command dial switch circuit 11 is coupled to the MCU 1 and to the command dial 35 (not shown in FIG. 2). A switch 16 is coupled to the operating button 29 (referred to as "Operating Button B" in FIG. 2), and a switch 17 is coupled to the operating button 28 (referred to as "Operating Button A" in FIG. 2). Depression of operating button 28 changes the state of the switch 17 and depression of the operating button 29 changes the state of the switch 16. An LCD driver 19 which drives the liquid crystal display device (LCD) 34 for external display use is also connected to the MCU 1.

Figure 3:
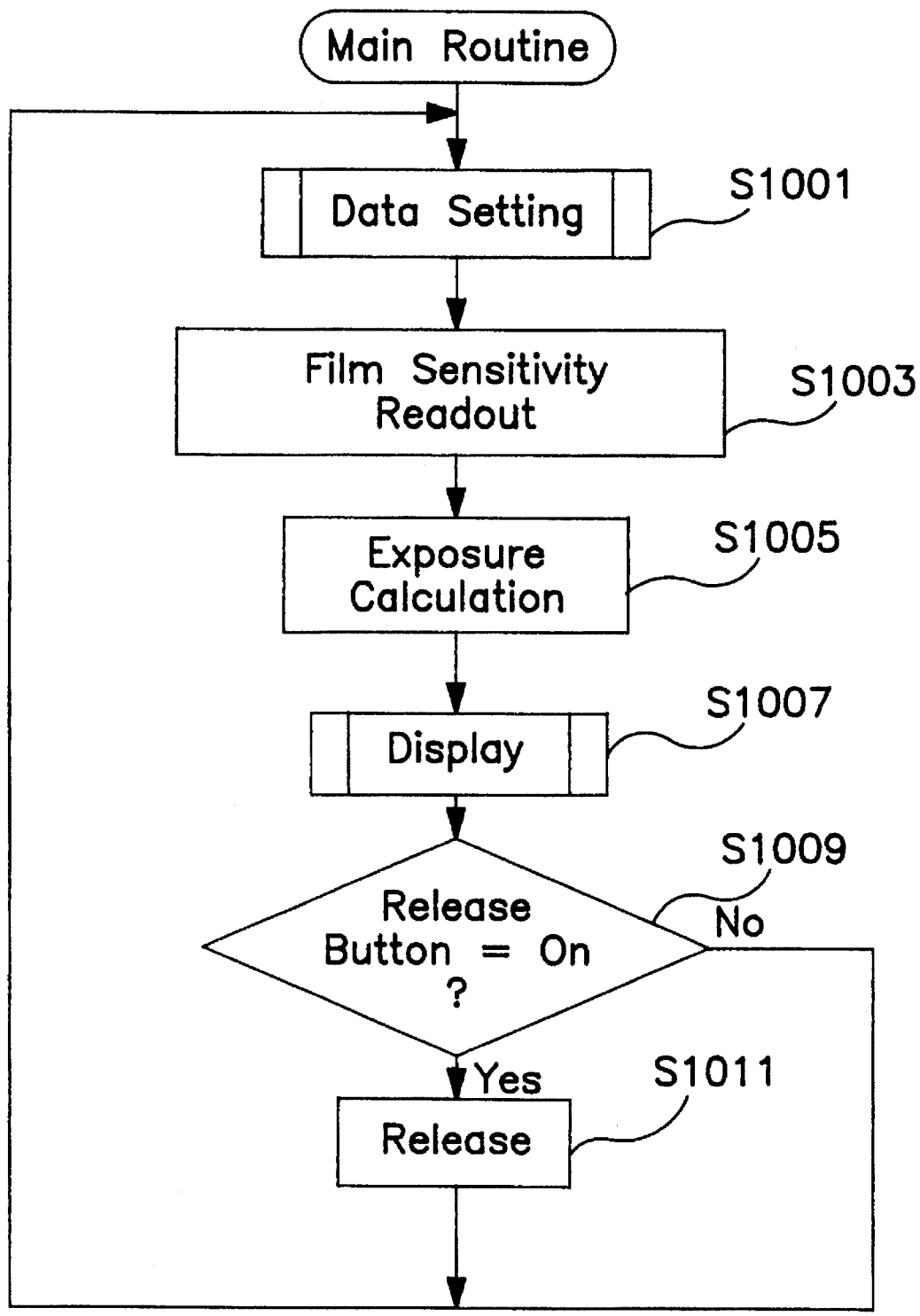
FIG. 3 is a flow chart of a main operational process in accordance with embodiments of the present invention.

By setting the main switch 7 of the camera ON, current is provided from the power supply control unit 6, and the MCU 1 controls camera operations in accordance with a main operational process shown in the flow chart of FIG. 3. The main operational process shown in FIG. 3 is performed as a continuous loop which is repeated until the main switch 7 is set OFF. The main operational process shown in FIG. 3 will now be described in detail below.

First, a data setting operational process, which will be described in detail later, is performed to set camera data (step S1001). The data setting is performed by operation of the operating buttons 28, 29 and the command dial 35. Next, film sensitivity data (ISO data) of the film loaded into the camera is read out (step S1003). An exposure calculation process is then executed (step S1005). A display operational process, described in detail later, is executed (step S1007) to display a selected camera function. It is then determined (step S1009) whether or not the release button 26 has been depressed. If the release button 26 has been depressed, the operational process proceeds to step S1011, and release processing is executed. If the release button 26 has not been depressed, the operational process returns to step S1001, and step S1001 through S1011 are repeated until the main switch 7 is set OFF.

In the film sensitivity readout operation of step S1003, the exposure calculation operation of step S1005, and the release processing of step S1011, control is performed according to the data which were set in the data setting operational process of step S1001.

The data setting operational process of step S1001 of FIG. 3 will be described with reference to the flow charts shown in FIGS. 4–8. The external operating system of the camera related to data setting includes the operating button 28 which controls camera function selection, the operating button 29 which controls camera function setting, the command dial 35, and the external display LCD 34.

As described above, the depression of the operating button 28 changes the state of the switch 17, the depression of the operating button 29 changes the state of the switch 16, and the operation of the command dial 35 changes the state of the command dial switch circuit 11. The switches 16 and 17 and the command dial switch circuit 11 are connected to respective input ports of the MCU 1.

In the flow charts of FIGS. 4–13, a flag indicating the state of the operating button 28 is referred to as _BUTTON_A, and a flag indicating the state of the operating button 29 is referred to as _BUTTON_B. The flag indicating the state of the operating buttons 28, 29 is set to zero when a respective operating button is depressed, and is set to 1 when a respective operating button is released. The above-described relationship between the pressed state of each operating button and the flags is shown in the table of FIG. 19.

Figure 4:
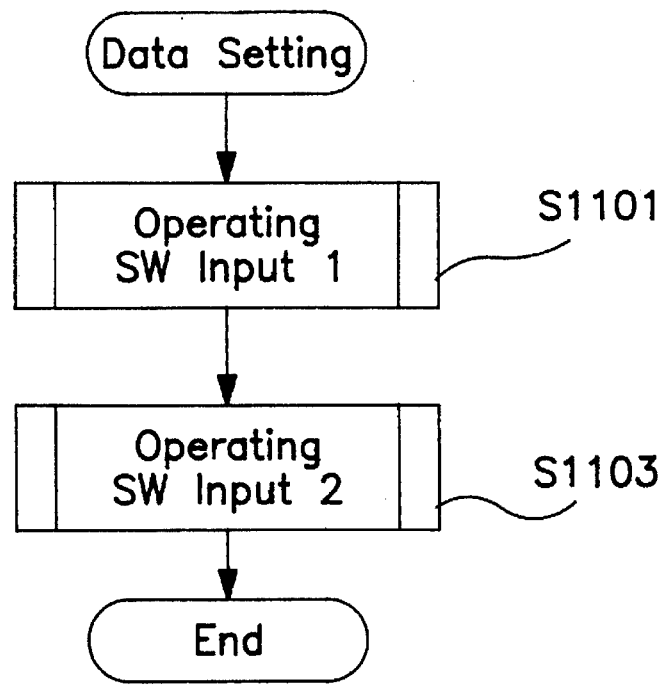
FIG. 4 is a flow chart of a data setting operational process in accordance with embodiments of the present invention.

As shown in the flow chart of FIG. 4, control of the data setting operation is performed in the sequence of operating switch input 1 (step S1101) and operating switch input 2 (step S1103).

In the operating switch input 1 of step S1101, firstly, input processing is performed to change a control state (DCMODE) for data setting by operating the operating button 28 and the operating button 29. The operating switch input 1 will be described in detail below with reference to the flow chart of FIG. 5. In the operating switch input 2 of step S1103, data setting changes are performed by operation of the command dial 35. The operating switch input 2 will be described in detail below with reference to the flow chart of FIG. 7.

FIG. 20 is a table showing a relationship between the DCMODE setting and a control state of the camera. DCMODE 0 corresponds to a normal control state; DCMODE 1 corresponds to function selection state; DCMODE 3 corresponds to a setting standby state; and, DCMODE 4 corresponds to a self setting state. It is noted that the information shown in the tables shown in FIGS. 20–30 is stored in memory in the camera MCU 1, or in other memory of the camera.

Figure 5:
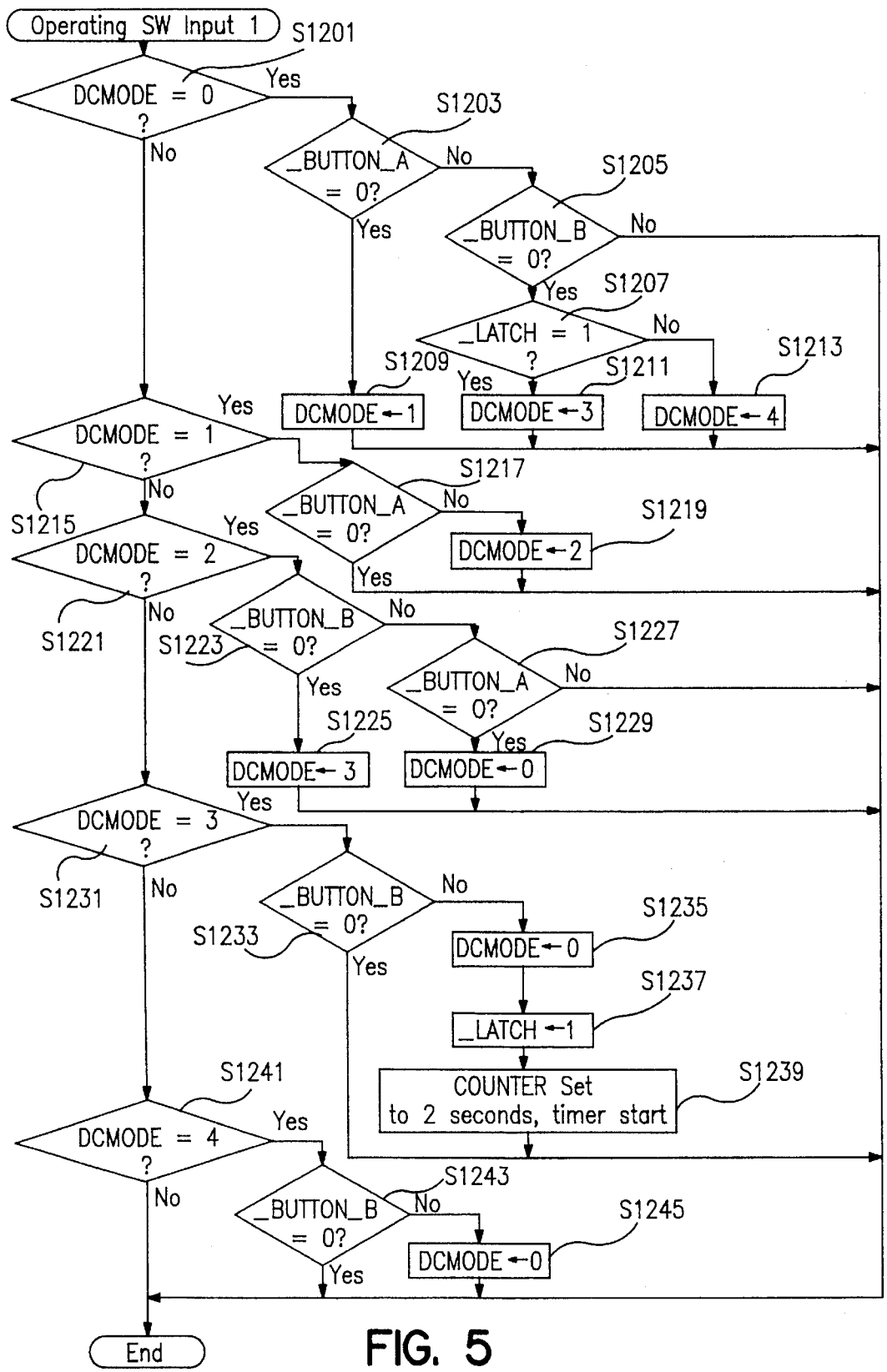
FIG. 5 is a flow chart of operating switch input 1 in accordance with embodiments of the present invention.

The operating switch input 1 operational process will now be described with reference to the flow chart of FIG. 5. The operating switch input 1 operational process sets the DCMODE according to the state (depressed or not depressed) of operating buttons 28, 29.

Figure 32:
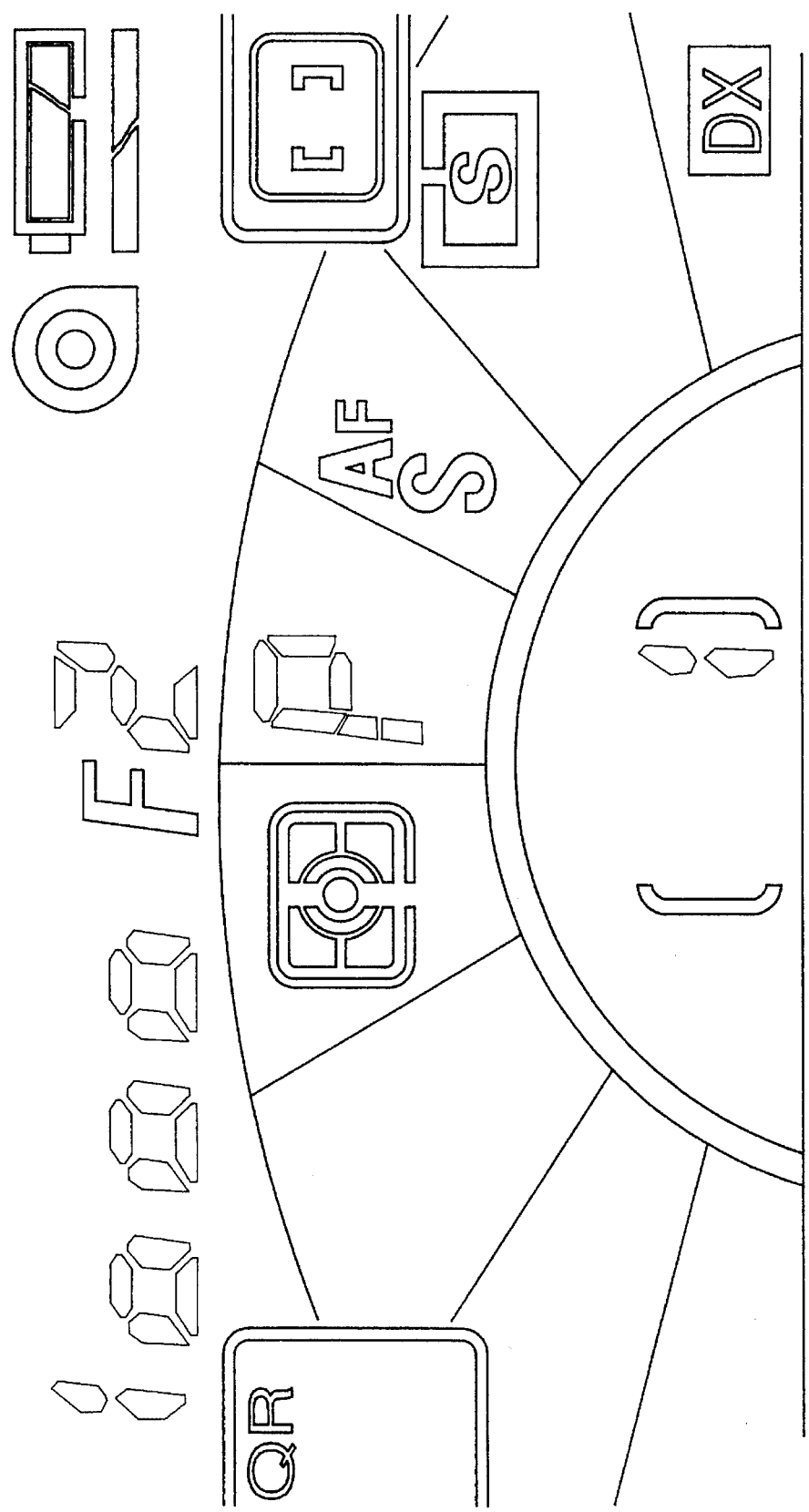
FIG. 32 an example of a camera display in a normal control state in accordance with embodiments of the present invention.

It is noted that directly after starting the electrical power supply (main switch 7 ON), when neither operating button 28 nor operating button 29 is depressed (_BUTTON_A=1, _BUTTON_B=1) the DCMODE=0. Accordingly, at this time the camera is in a normal control state. An example of a display at this time is shown in FIG. 32.

Firstly, in step S1201, it is determined whether or not DCMODE is 0, specifically, whether or not the camera is in the normal control state. If DCMODE is 0, the operational process proceeds to step S1203. If DCMODE is not 0, the operational process continues in step S1215.

In step S1203, it is determined whether or not the operating button 28 is depressed (_BUTTON_A=0). If the operating button 28 is depressed, DCMODE is set to 1 (step S1209), indicating a function selection state, and the operational process shown in the flow chart of FIG. 5 ends. When the operating button 28 is not depressed, the operational process proceeds to step S1205.

In step S1205, it is determined whether or not the operating button 29 is depressed (_BUTTON_B=0). If the operating button 29 is not depressed, the operational process shown in the flow chart of FIG. 5 ends. If the operating button 29 is depressed, the operational process proceeds to step S1207.

In step S1207, it is determined whether or not a _LATCH flag is 1. The setting of the _LATCH flag is described below. If the _LATCH flag is 1, the DCMODE is set to 3 (step S1211) indicating a function setting state, and the operational process ends with the camera in the function setting state. If the _LATCH flag is 0, the DCMODE is set to 4 (step S1213), and the operational process ends with the camera in a self setting state.

Next, in step S1215, it is determined whether or not DCMODE is 1, specifically, whether the camera is in a function selection state. If DCMODE is 1, the operational process proceeds to step S1217. If DCMODE is not 1, the operational process proceeds to step S1221. An example of a display performed when DCMODE is 1 in step S1215 in shown in FIGS. 34, 35 and 36.

In step S1217, it is determined whether or not the operating button 28 is depressed. If the operating button 28 is depressed, the operational process shown in the flow chart of FIG. 5 ends. When the operating button 28 is not depressed, DCMODE is set to 2 (step S1219), and the operational process ends with the camera in a function selection standby state.

Figure 37:
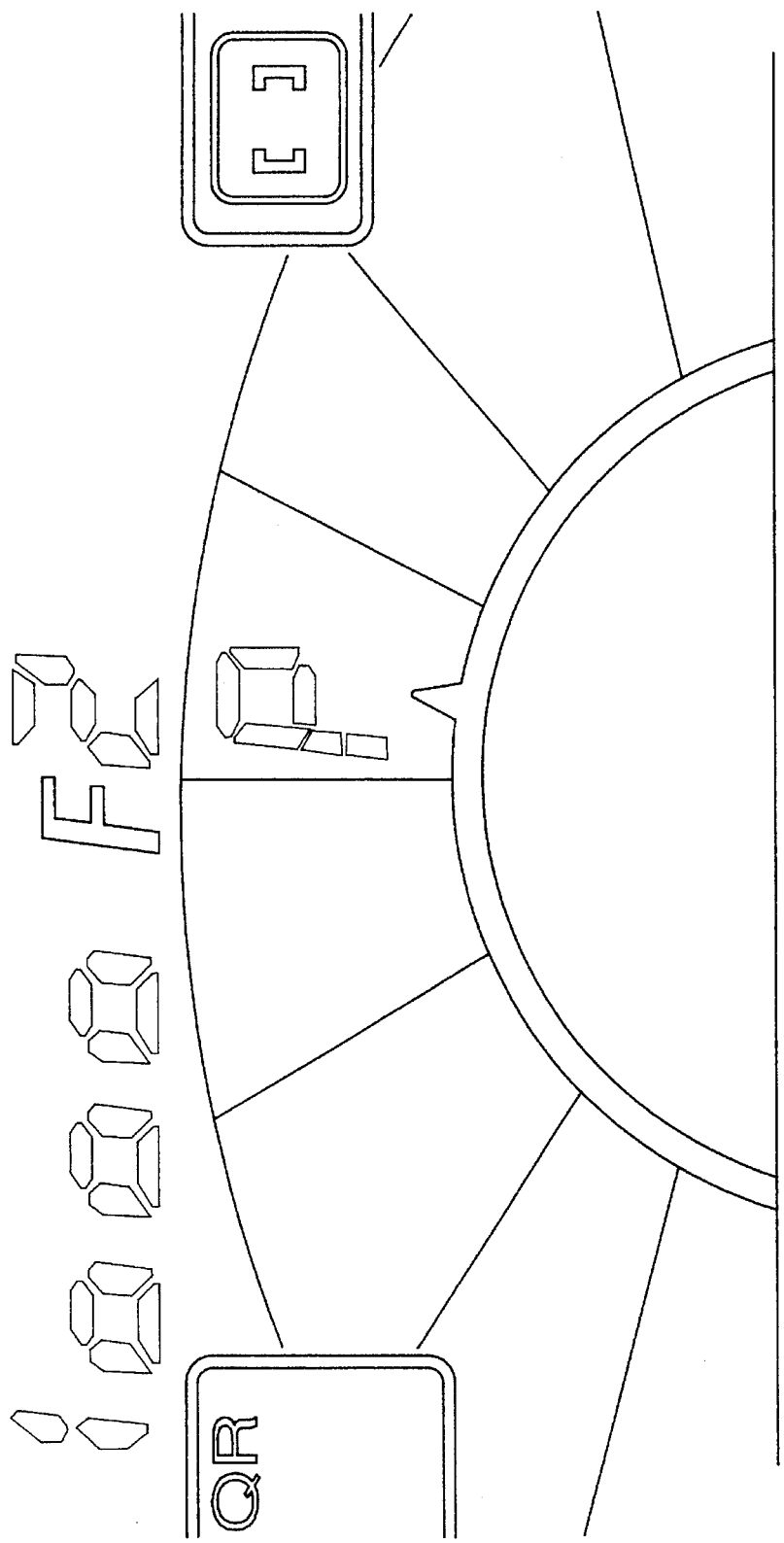
FIG. 37 is an example of a display when a selection button has been released after an exposure mode area has been selected in accordance with embodiments of the present invention.
Figure 38:
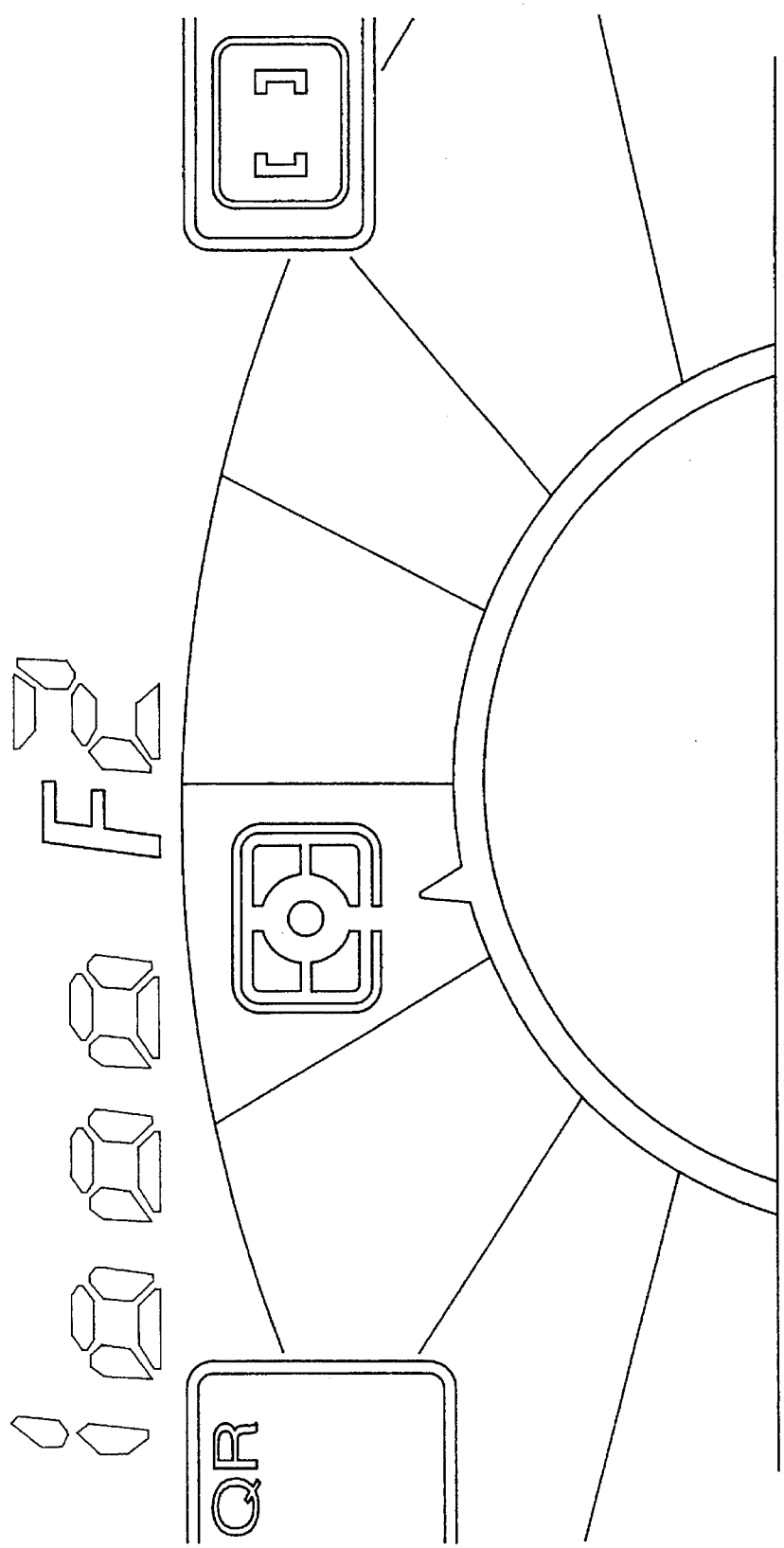
FIG. 38 is an example of a display when a selection button has been released after a photometric mode area has been selected in accordance with embodiments of the present invention.
Figure 39:
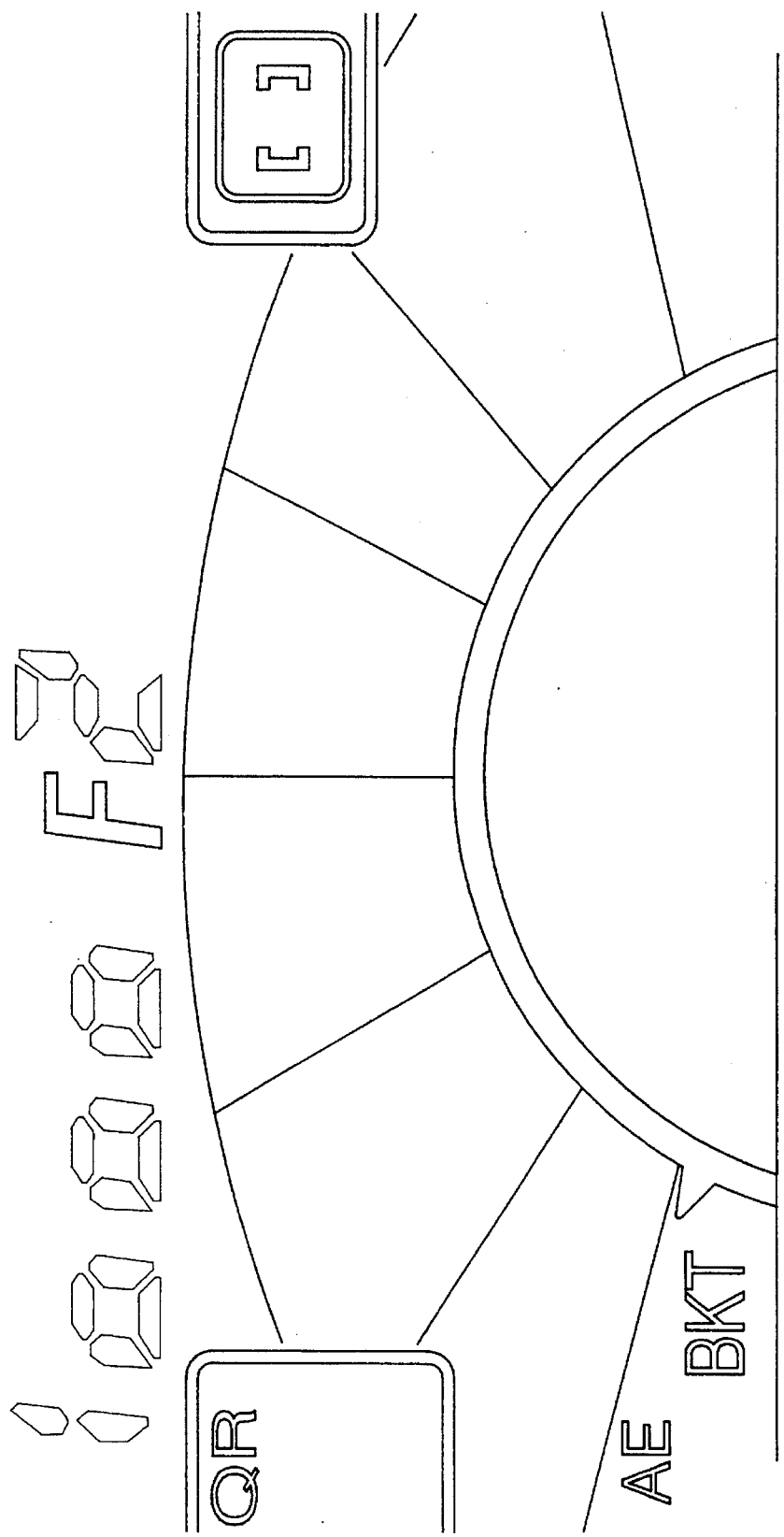
FIG. 39 is an example of a display when a selection button has been released after exposure bracketing of a bracketing area has been selected in accordance with embodiments of the present invention.

Next, in step S1221, it is determined whether or not DCMODE is 2, specifically, whether the camera is in a function selection standby state. If DCMODE is 2, the operational process proceeds to step S1223. If DCMODE is not 2, the operational process proceeds to step S1231. An example of a display performed when DCMODE is 2 in step S1221 is shown in FIGS. 37, 38 and 39.

In step S1223, it is determined whether or not the operating button 29 is depressed. If operating button 29 is depressed, DCMODE is set to 3 in step S1225, and the operational process ends with the camera in the function setting state. When the operating button 29 is not depressed, the operational process proceeds to step S1227.

In step S1227, it is determined whether or not the operating button 28 is depressed. If the operating button 28 is not depressed, the operational process ends. If the operating button 28 is depressed, DCMODE is set to 0 in step S1229, and the operational process ends with the camera in a normal control state.

Figure 40:
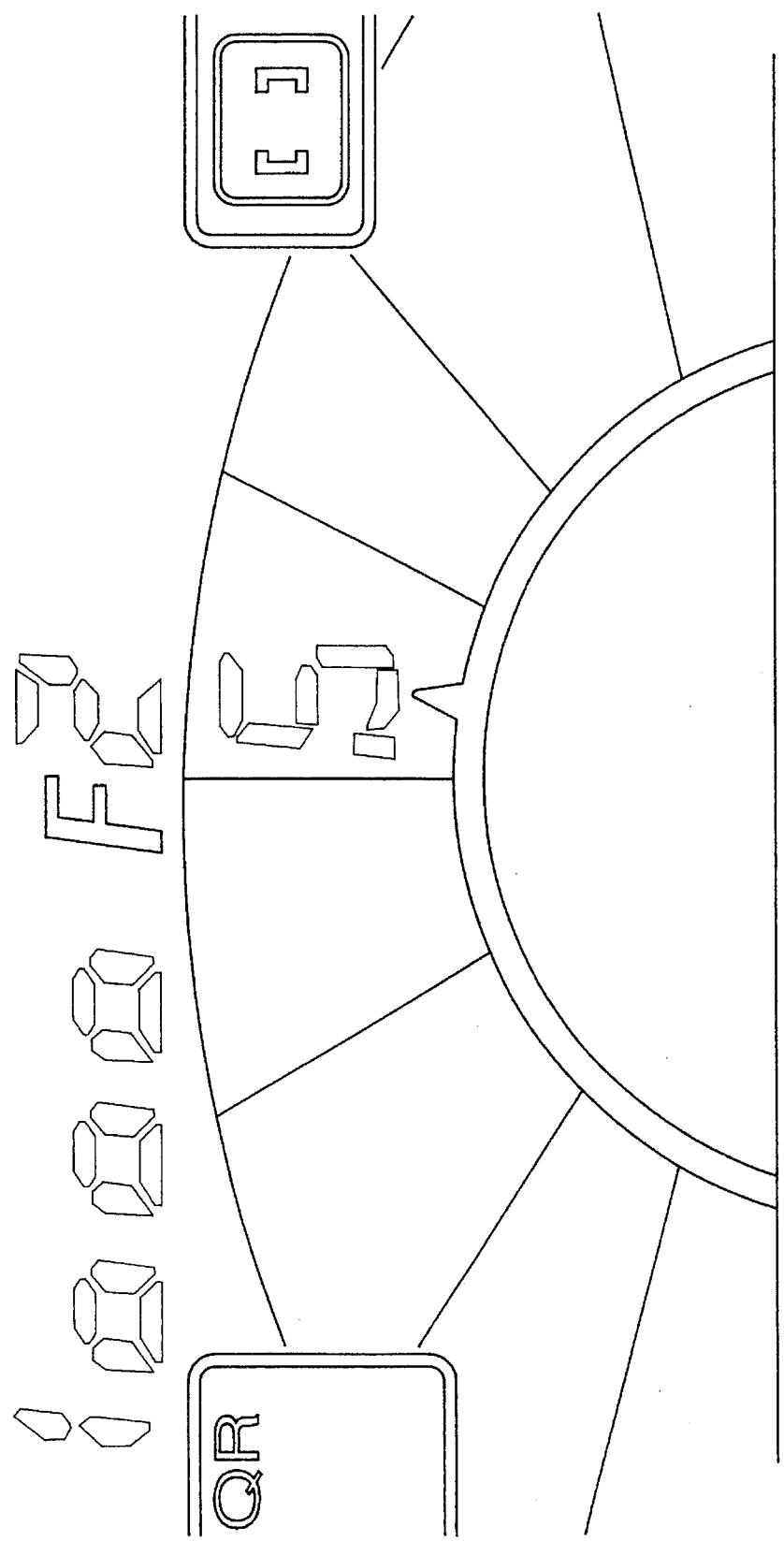
FIG. 40 is an example of a display when the exposure mode is set in accordance with embodiments of the present invention.
Figure 41:
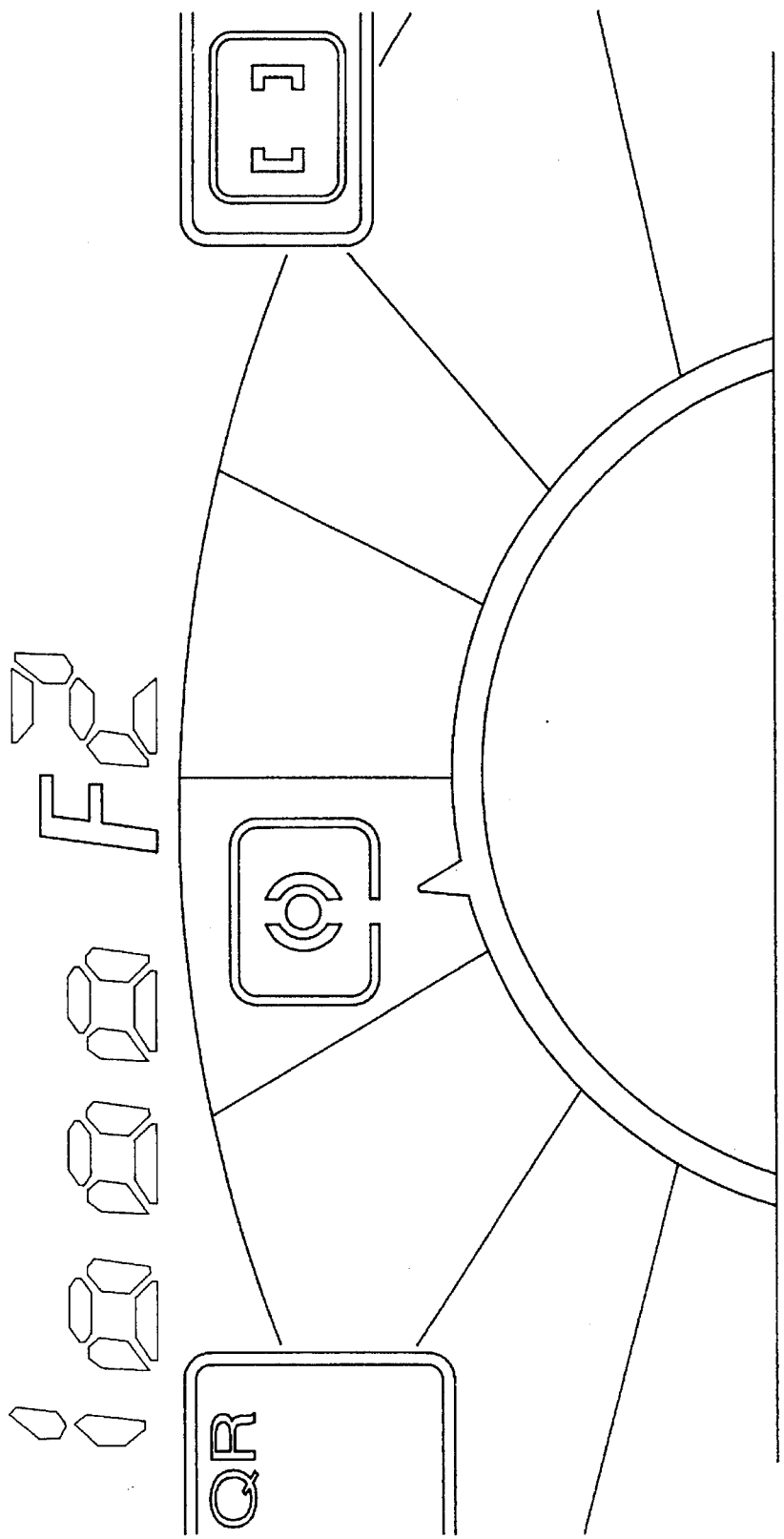
FIG. 41 is an example of a display when a photometric mode is set in accordance with embodiments of the present invention.
Figure 42:
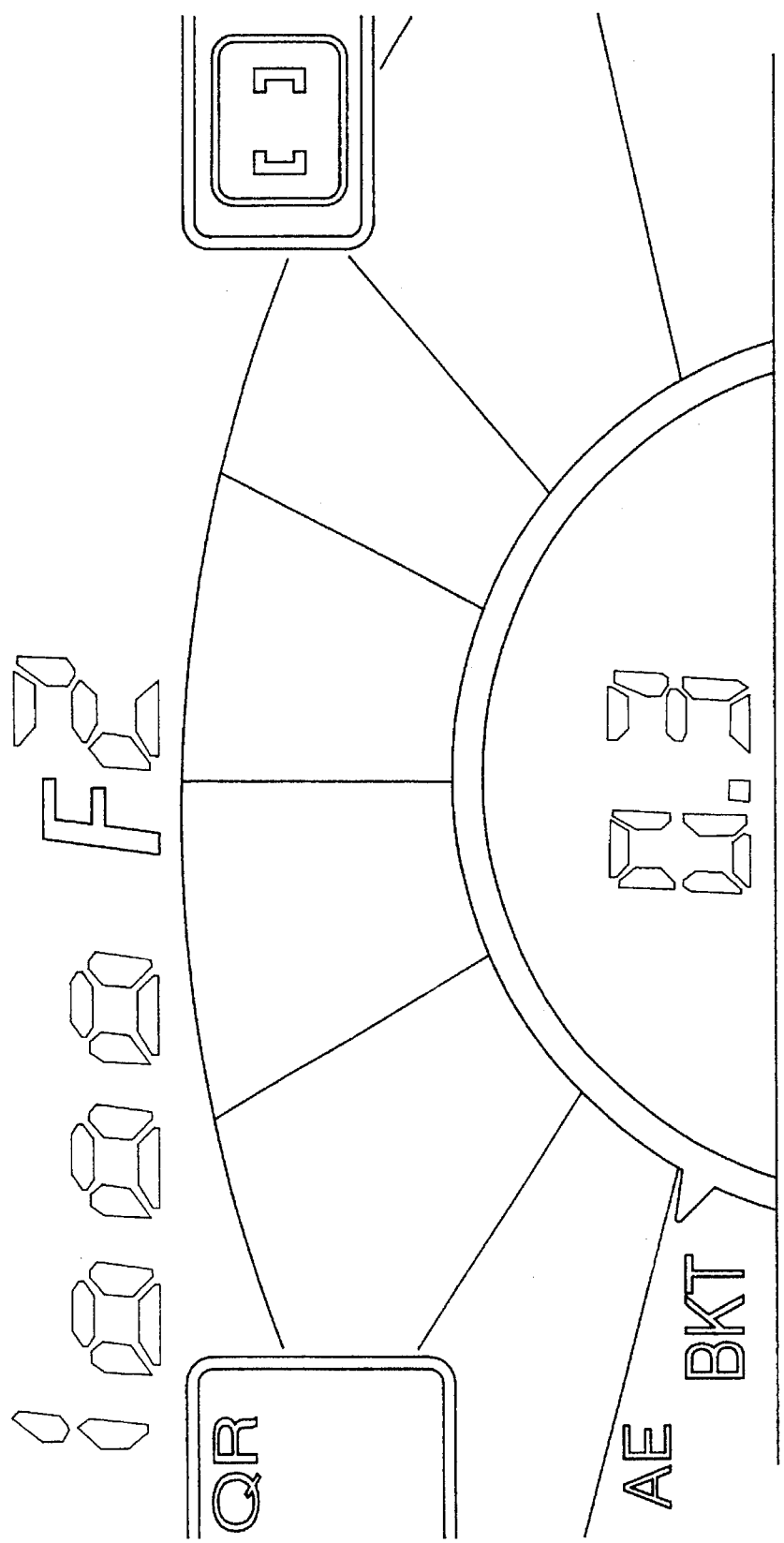
FIG. 42 is an example of a display when exposure bracketing of a bracketing area has been set in accordance with embodiments of the present invention.

Next, it is determined in step S1231 whether or not DCMODE is 3, specifically, whether the camera is in a function setting state. If DCMODE is 3 the operational process proceeds to step S1233. If DCMODE is not 3, the operational process proceeds to step S1241. FIGS. 40, 41 and 42 show an example of a display performed when DCMODE is 3 in step S1231.

In step S1233, it is determined whether or not the operating button 29 is depressed. If the operating button 29 is depressed, the operational process ends. If the operating button 29 is not depressed, DCMODE is set to 0 in step S1235, and the operational process proceeds to step S1237. In step S1237, the _LATCH flag is set to 1, and, in step S1239, a COUNTER is set to two seconds, a timer start is performed and the operational process ends. The timer start is described below.

Figure 33:
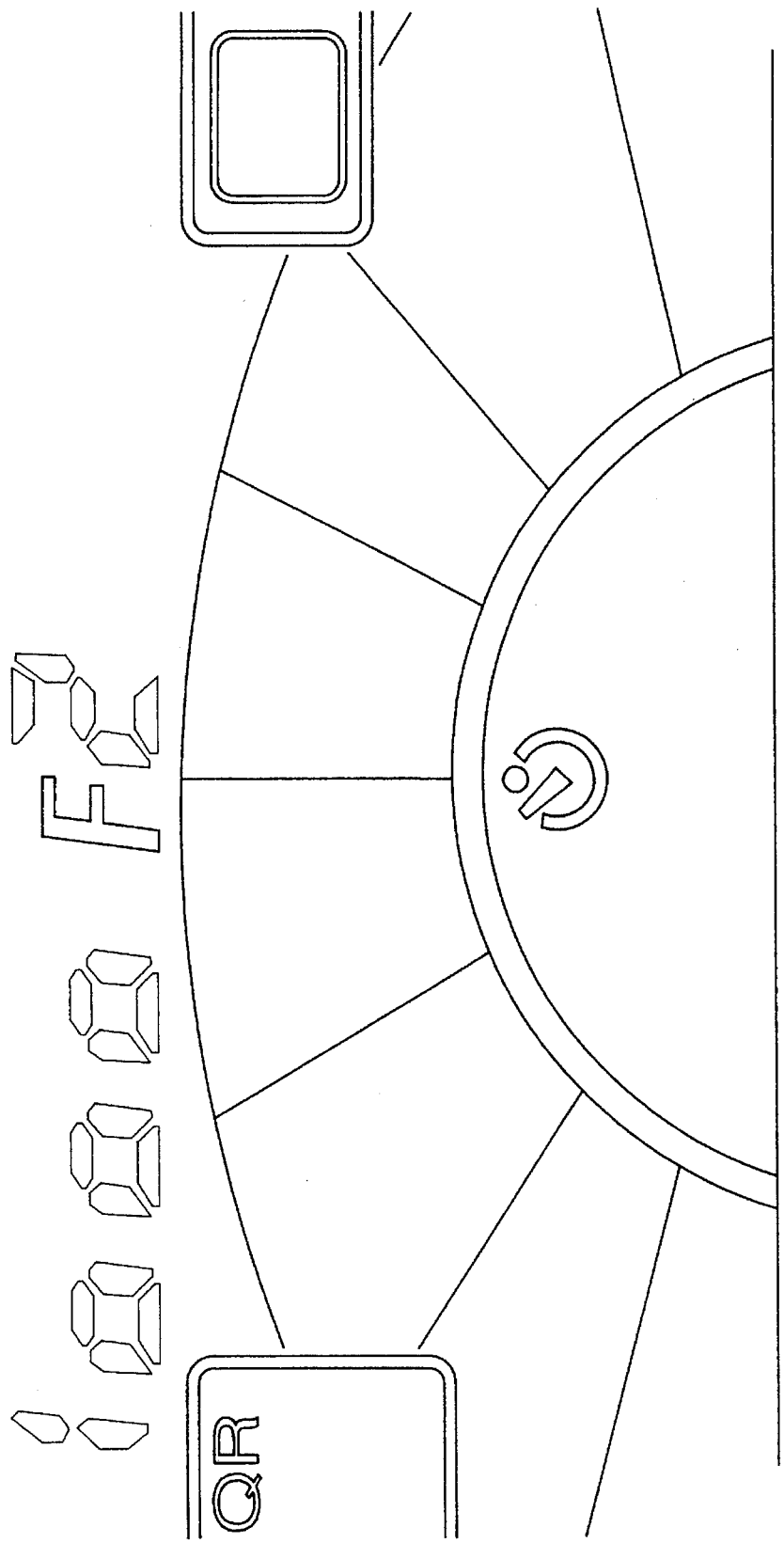
FIG. 33 is an example of a camera display in a self setting state in accordance with embodiments of the present invention.

Next, in step S1241, it is determined whether or not DCMODE is 4, specifically, whether the camera is in a self setting state. If DCMODE is 4 the operational proceeds to step S1243. If DCMODE is not 4, the operational process ends. FIG. 33 shows an example of a display performed when DCMODE is 4.

In step S1243, it is determined whether or not the operating button 29 is depressed. If the operating button 29 is depressed, the operational process ends. If the operating button 29 is not depressed, DCMODE is set to 0 in step S1245, and the operational process ends.

Accordingly, the control state of the camera can be set by the operating buttons 28, 29, as described with reference to the flow chart of FIG. 5.

Figure 6:
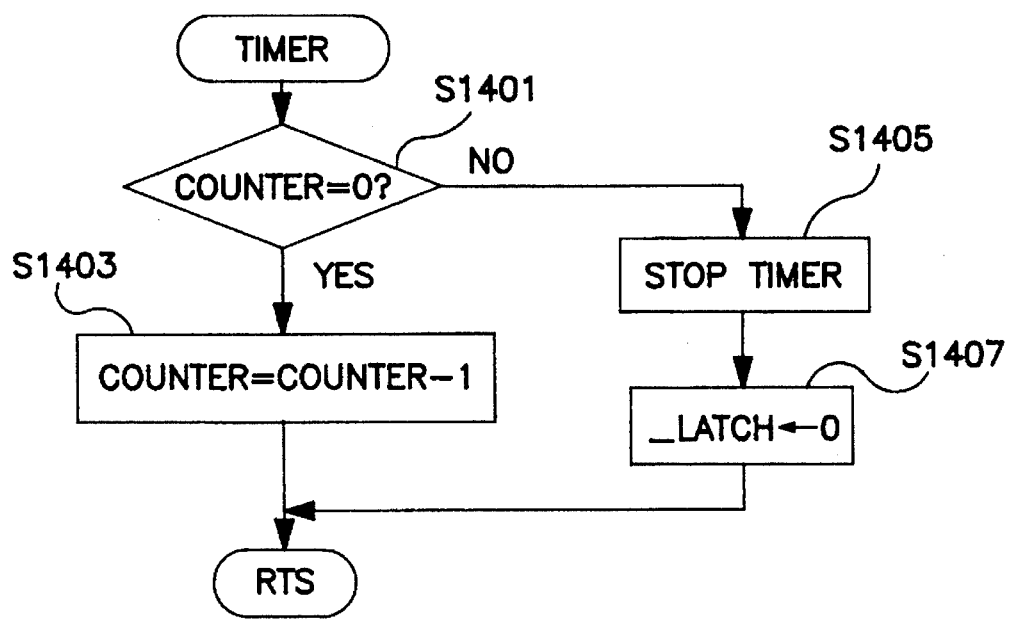
FIG. 6 is a flow chart of a timer operational process in accordance with embodiments of the present invention.

The timer start operational process which is performed in step S1239 of the flow chart of FIG. 5 will now be described with reference to the flow chart of FIG. 6. Firstly, in step S1401, it is determined whether or not the timer has timed out by checking whether COUNTER is set to 0. If COUNTER is not 0, the COUNTER value is decremented by 1. When the COUNTER is 0, the timer function stops (steps 1405) and the _LATCH flag is set to 0 (step S1407).

The timer function, for example, when the user is unsuccessful in effecting a function setting, sets a delay before returning to the setting state directly prior to the unsuccessful setting. More specifically, in accordance with embodiments of the present invention, when the operating button 29 is pressed independently, the camera is set to a self-timer mode. However, the set state can be returned to a state ended directly prior to an unsuccessful setting of the self-timer mode within the delay time set by the timer (e.g., within 2 seconds), when the operating button 29 was independently depressed.

Figure 7:
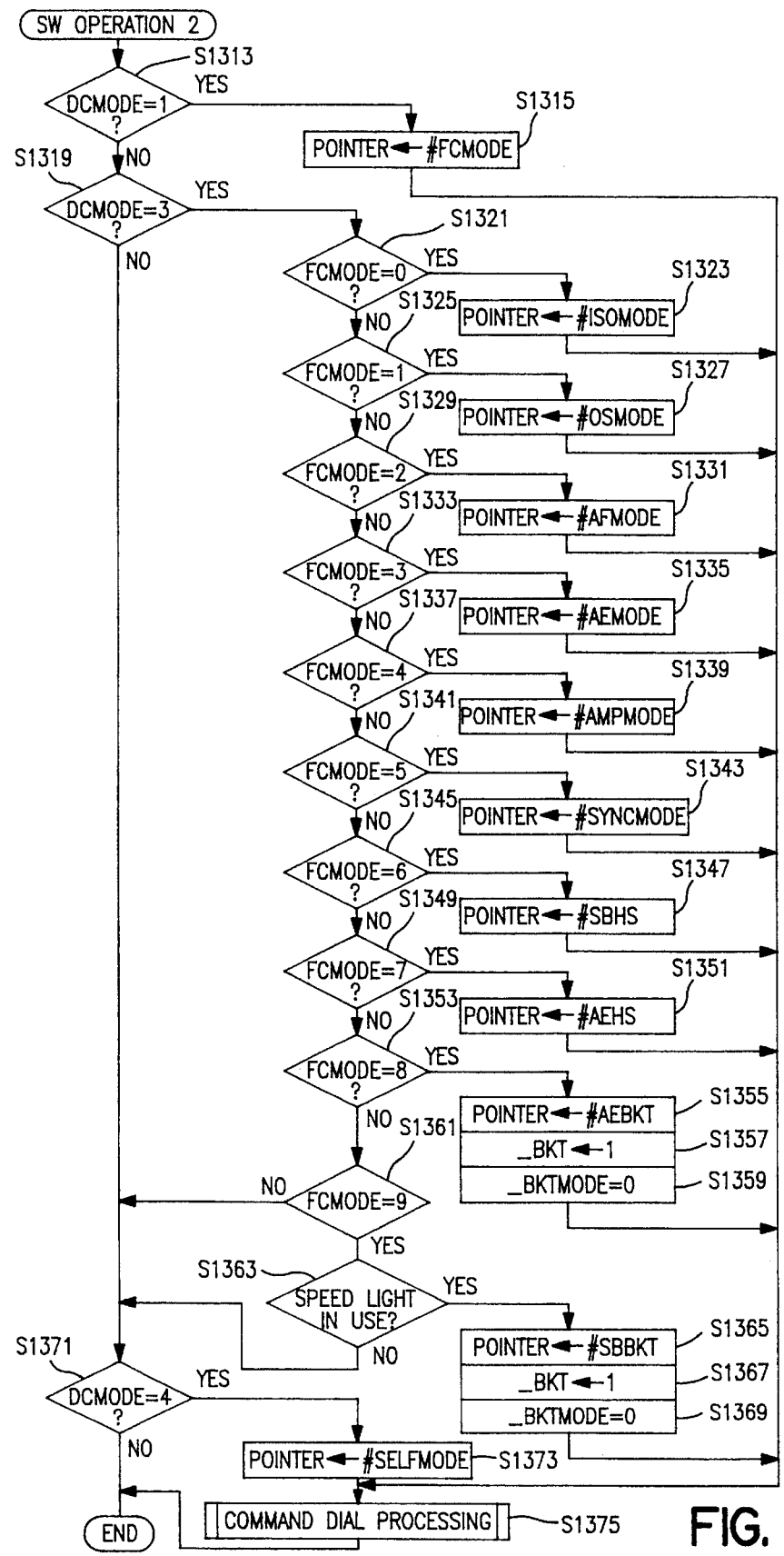
FIG. 7 is a flow chart of operating switch input 2 in accordance with embodiments of the present invention.

FIG. 7 is a flow chart showing an operational process for operating input switch 2. In accordance with the operating switch input 2 operational process data setting changes are performed by operation of the command dial 35.

Firstly, in step S1313, it is determined whether or not DCMODE is 1 indicating the camera is in a function selection state. If DCMODE is 1, the operational process proceeds to step S1315. If DCMODE is not 1, the operational process proceeds to step S1319.

In step S1315, when it has been determined in step S1313 that the camera is in a function selection state, an FCMODE address is stored in a register in the MCU 1 as a variable POINTER. The table of FIG. 21 shows a relationship between the FCMODE and the camera setting. The FCMODE indicates various camera settings, such as AF mode, exposure mode, photometric mode, etc. After the FCMODE address has been input to POINTER, the operational process proceeds to step S1375 where command dial processing is performed, as will be described in detail hereinafter.

In step S1319, it is determined whether or not DCMODE is 3 (i.e., whether the camera is in a function setting state). If DCMODE is 3, the operational process proceeds to step S1321. If DCMODE is not 3, the operational process proceeds to step S1371.

In step S1321, it is determined whether or not FCMODE is 0. If FCMODE is 0, the content of POINTER is set to an ISOMODE (film sensitivity mode) address in step S1323, and the operational process proceeds to step S1375. If FCMODE is not 0, the operational process proceeds to step S1325.

In step S1325, it is determined whether or not FCMODE is 1. If FCMODE is 1, the content of POINTER is set to a QSMODE (film forwarding mode) address (step S1327), and the operational process proceeds to step S1375. If FCMODE is not 1, the operational process proceeds to step S1329.

In step S1329, it is determined whether or not FCMODE is 2. If FCMODE is 2, the content of POINTER is set to an AFMODE (focus mode) address (step S1331), and the operational process proceeds to step S1375. If FCMODE is not 2, the operational process proceeds to step S1333.

In step S1333, it is determined whether or not FCMODE is 3. If FCMODE is 3, in step S1335 the content of POINTER is set to an AEMODE (exposure mode) address, and the operational process proceeds to step S1375. If FCMODE is not 3, the operational process proceeds to step S1337. FIG. 40 shows an example of a display when FCMODE is 3.

In step S1337, it is determined whether or not FCMODE is 4. If FCMODE is 4, the content of POINTER is set to an AMPMODE (photometric mode) address (step S1338), and the operational process proceeds to step S1375. If FCMODE is not 4, the operational process proceeds to step S1341. FIG. 41 shows an example of a display when FCMODE is 4.

In step S1341 it is determined whether or not FCMODE is 5. If FCMODE is 5, the content of POINTER is set to a SYNCMODE (syncho mode) address (step S1343), and the operational process proceeds to step S1375. If FCMODE is not 5, the operational process proceeds to step S1345.

In step S1345, it is determined whether or not FCMODE IS 6. If FCMODE is 6, the content of POINTER is set to an SHBS (light regulation correction) address (step S1347), and the operational process proceeds to step S1375. If FCMODE is not 6, the operational process proceeds to step S1349.

In step S1349, it is determined whether or not FCMODE is 7. If FCMODE is 7, the content of POINTER is set to an AEHS (exposure correction) address (step S1351), and the operational process proceeds to step S1375. If FCMODE is not 7, the operational process proceeds to step S1353.

In step S1353, it is determined whether or not FCMODE is 8. If FCMODE is 8, the content of POINTER is set to an AEBKT (exposure bracketing) address (step S1355), a flag BKT is set to 1 (step S1357), a flag BKTMODE is set to 0, and the operational process proceeds to step S1375. If FCMODE is not 8, the operational process proceeds to step S1361. FIG. 42 shows an example of a display when FCMODE is 8.

In step 1361, it is determined whether or not FCMODE is 9. If FCMODE is 9, the operational process proceeds to step S1363. If FCMODE is not 9, the operational process proceeds to step S1371.

In step S1363, it is determined whether or not the speed light is in use. The speed light may include a strobe light and is generally an electronic flash. If the speed light is in use, the content of POINTER is set to an SBBKT address (step S1365), BKT is set to 1 (step S1367), BKTMODE is set to 1 (step 1369), and the operational process proceeds to step S1375. The function SBBKT changes the amount of radiation output by the speed light at a release operation. If the speed light is not in use, the operational process proceeds to step S1371.

In step S1371, it is determined whether or not DCMODE is 4 (i.e, the camera is in a self setting state). If DCMODE is 4, the content of POINTER is set to a SELFMODE address (step S1373), and the operational process proceeds to step S1375. The SELFMODE function sets a predetermined time lag from when the release button is pressed until the release operation action. In accordance with embodiments of the present invention, the time lag is from 0 to 10 seconds. If FCMODE is not 4, the operational process ends. In step S1375, command dial processing is performed, as described below, and the operational process in the flow chart shown in FIG. 7 ends.

Figure 8:
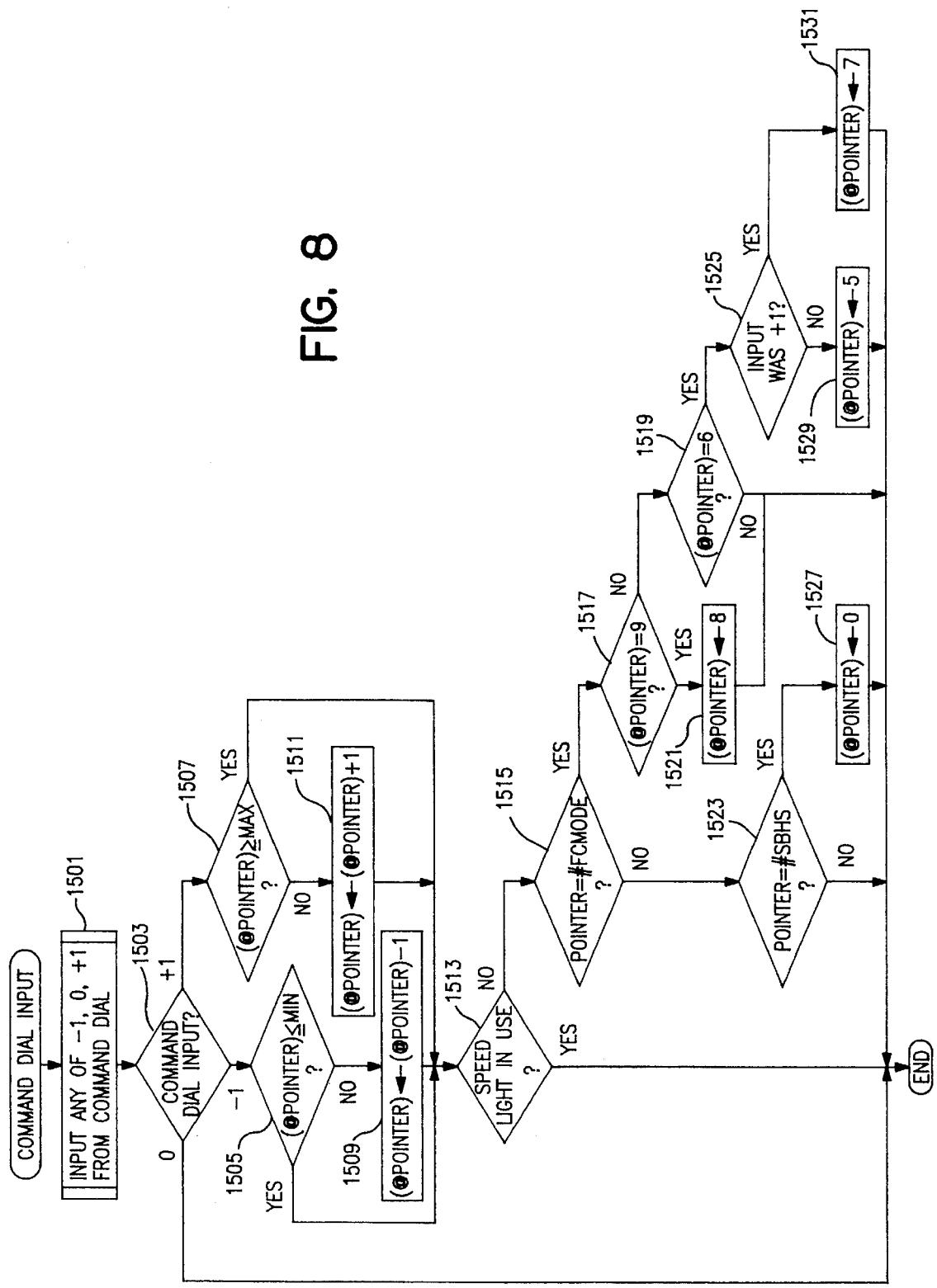
FIG. 8 is a flow chart of a command dial operational process in accordance with embodiments of the present invention.

The command dial processing performed in step S1375 of the flow chart of FIG. 7 will now be described with reference to FIG. 8. The command dial processing performs processing of the information stored in memory at POINTER's address.

Firstly, in step S1501, command dial rotation, if any, is input to the MCU 1 from the command dial 35 via the command dial switch circuit 11. In step S1503, it is determined whether or not there was a command dial input in step S1501. Specifically, when rotation of the command dial is not detected, the output of the command dial switch circuit 11 is 0, and the operational process shown in the flow chart of FIG. 8 ends. When clockwise rotation of the command dial 35 is detected (with the camera being viewed from the top surface, as shown in FIG. 1), the command dial switch circuit 11 outputs −1, and the operational process proceeds to step S1505. Alternatively, when counter-clockwise rotation of the command dial is detected, the command dial switch circuit outputs +1, and the operational process proceeds to step S1507.

In step S1505, it is determined whether or not the numerical value of POINTER (i.e., the value stored at the address designated by POINTER) is less than or equal to a minimum value (e.g., 0 in accordance with embodiments of the present invention). If the value of POINTER is less than or equal to the minimum value, the operational process proceeds to step S1513. If the value of POINTER is greater than the minimum value, the numerical value of POINTER is reduced by 1 (step S1509), and the operational process proceeds to step S1513.

In step S1507, it is determined whether or not the numerical value of POINTER is greater than or equal to a predetermined maximum value. If the numerical value of POINTER is greater than or equal to maximum value, the operational process proceeds to step S1513. If the numerical value of POINTER is not greater than or equal to the maximum value, the numerical value of POINTER is increased by 1 (step S1511), and the operational process proceeds to step S1513.

In step S1513, it is determined whether or not the speed light is in use. If the speed light is use in the operational process in the flow chart FIG. 8 ends. If the speed light is not in use, the operational process proceeds to step S1515.

In step S1515, it is determined whether or not POINTER is equal to the address of FCMODE. If POINTER is equal to FCMODE, the operational process proceeds to step S1517. If POINTER is not equal to FCMODE, the operational process proceeds to step S1523. In step S1523, it is determined whether or not POINTER is equal to SBHS. If POINTER is equal to SBHS, the operational process proceeds to step S1527, POINTER set to 0 and the operational process in the flow chart shown in FIG. 8 ends. If POINTER is not equal to SBHS, the operational process ends.

In step S1517, it is determined whether or not POINTER is 9. If POINTER is 9, POINTER is set to 8 (step S1521) and the operational process ends. If POINTER is not 9, the operational process proceeds to step S1519.

In step S1519, it is determined whether or not POINTER is 6. If POINTER is 6, the operational process proceeds to step S1525. If POINTER is not 6, the operational process ends.

In step S1525, it is determined whether or not the input in step S1503 was +1. If the input in step S1503 was +1, POINTER is set to 7 (step S1531), and the operational process in the flow chart of FIG. 8 ends. If the input in step S 1503 was not +1, POINTER is set to 5 (step S1529) and the operational process in the flow chart of FIG. 8 ends.

The operational process steps beginning in step S1513 and steps following inhibit entering the mode in which the speed light is used, in the unlikely event that the speed light is in a state in which light generation is impossible. Accordingly, if the speed light mode is set and the speed light is in a state in which light generation is impossible, the speed light does not function even though it is set, and the performance of useless photographic operations which entail useless setting can be avoided.

Figure 9:
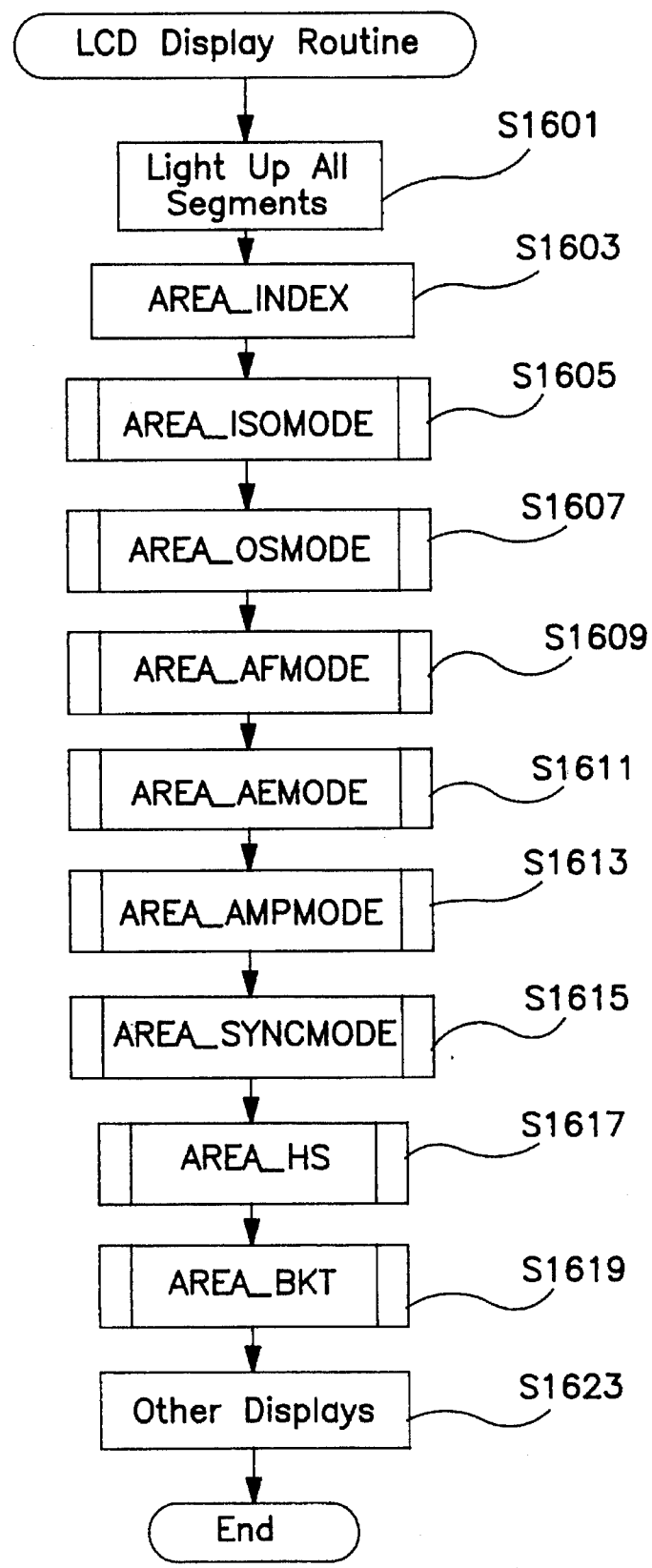
FIG. 9 is a main flow chart of a display operational process in accordance with embodiments of the present invention.

The display operational process of step S1007 of FIG. 3 will be described below with respect to the flow charts of FIGS. 9–18. FIG. 9 is a main operational process for performing display in accordance with embodiments of the present invention.

Figure 31:
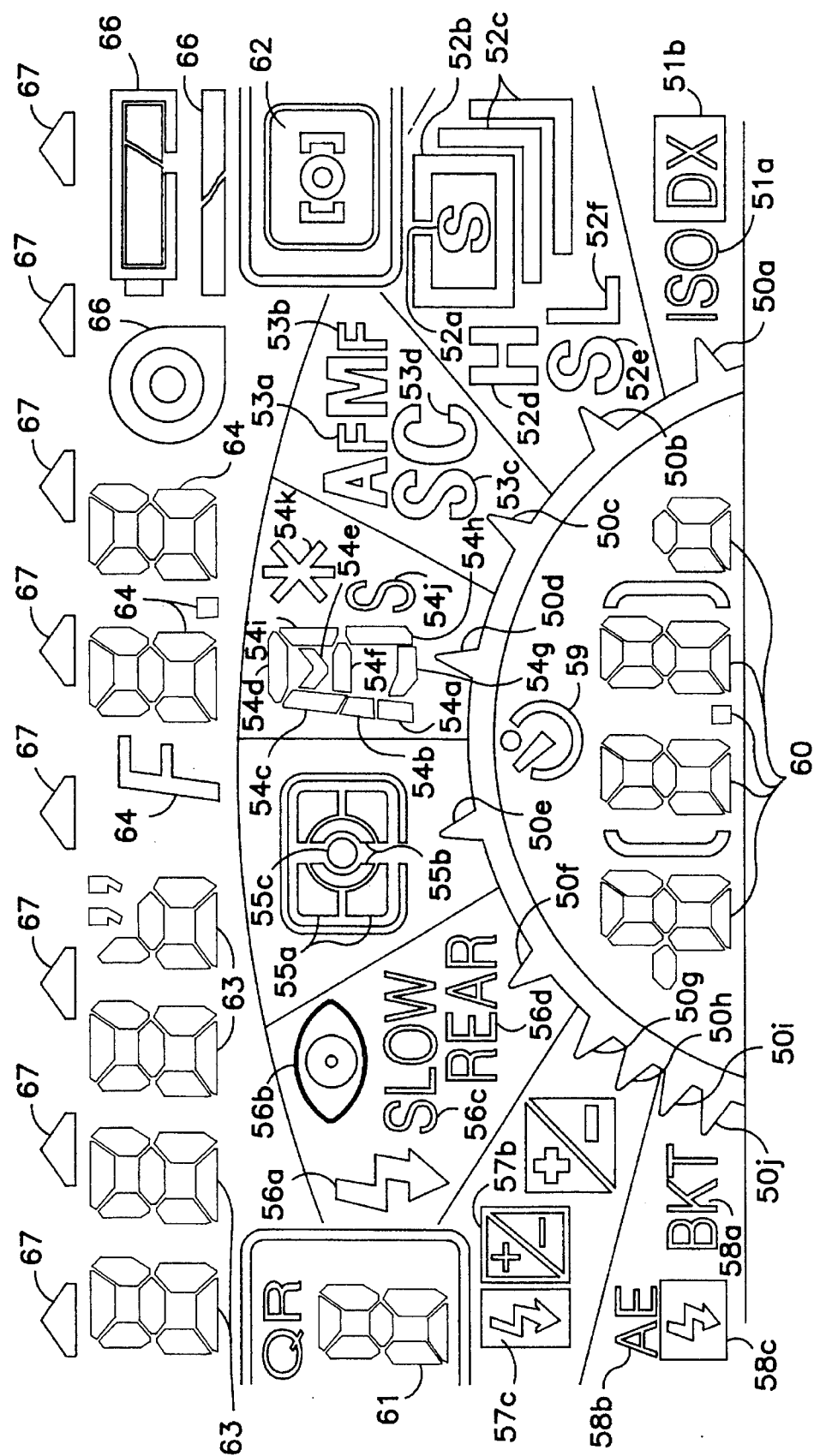
FIG. 31 is a segment location diagram of the external display LCD in accordance with embodiments of the present invention.

Beginning in step S1601, all the segments for display use are lighted. The display segments are described hereinafter with reference to FIG. 31. Next, in step S1603, an AREA INDEX operational process is executed which controls whether the area indication marks 50a–50j are lighted. The AREA INDEX operational process will be described below with reference to FIG. 10.

In step S1605, an AREA ISOMODE operational process is performed, which controls a display zone for the film sensitivity information (ISO information). The AREA ISOMODE operational process is described below with reference to FIG. 11.

In step S1607, an AREA QSMODE operational process is performed which controls a display zone for film forwarding data. The AREA QSMODE operational process is described below with reference to FIG. 12.

In step S1609, an AREA AFMODE operational process is performed which controls a display zone for AF mode data. The AREA AFMODE operational process is described below with reference to FIG. 13.

In step S1611, an AREA AEMODE operational process is performed which controls a display zone for AE mode data. The AREA AEMODE operational process is described below with reference to FIG. 14.

In step S1613, an AREA AMPMODE operational process is performed which controls a display zone for photometric mode data. The AREA AMPMODE operational process is described below with reference to FIG. 15.

In step S1615, an AREA SYNCMODE operational process is performed which controls a display zone for speed light generation mode data. The AREA SYNCMODE operational process is described below with reference to FIG. 16.

In step S1617, an AREA HS operational process is performed which controls a display zone for correction data. The AREA HS operational process is described below with reference to FIG. 17.

In step S1619, an AREA BKT operational process is performed which controls a display zone for bracket data. The AREA BKT operational process is described below with reference to FIG. 18.

Figure 10:
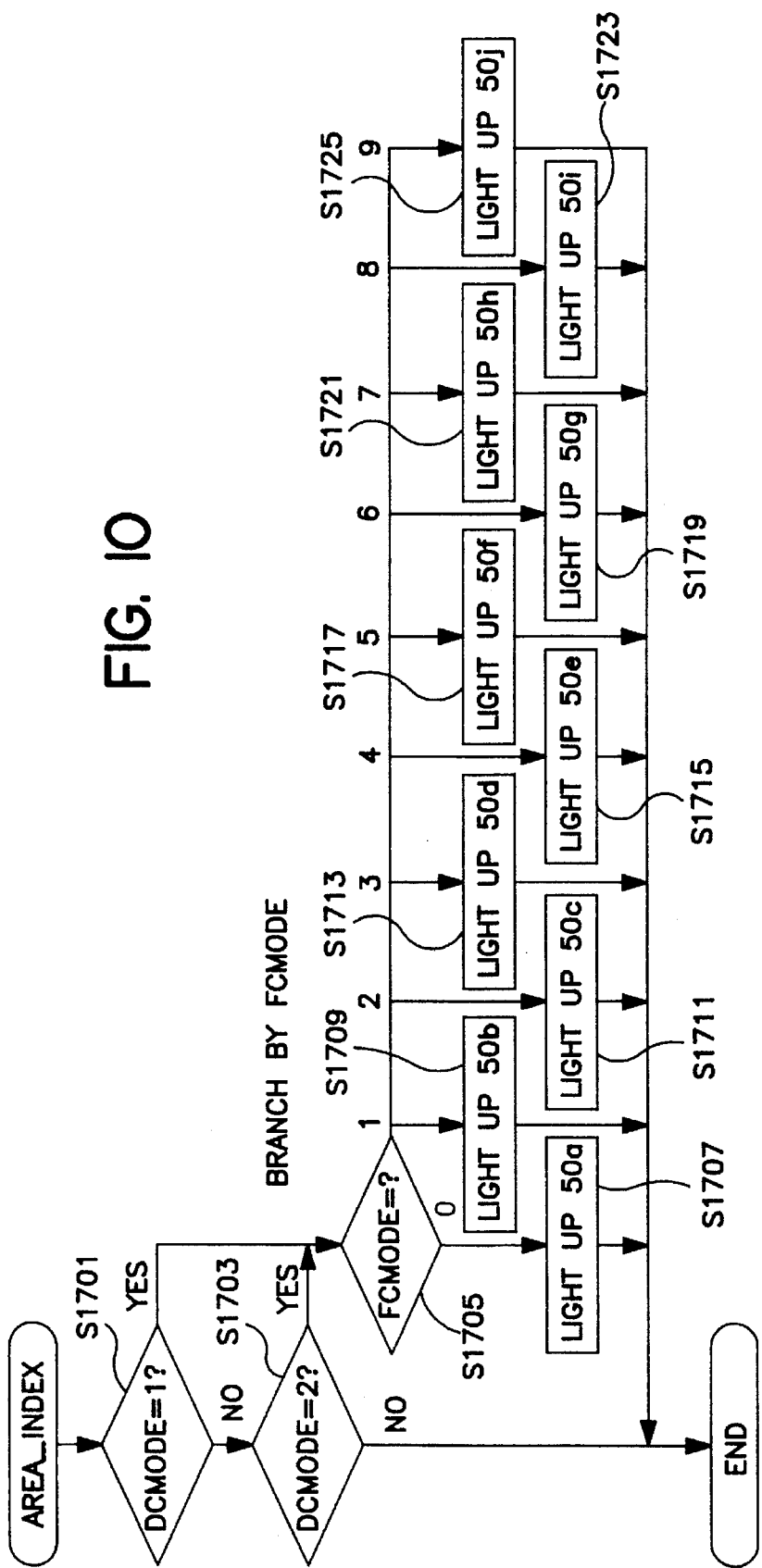
FIG. 10 is a flow chart of an index display operational process in accordance with embodiments of the present invention.

The AREA INDEX operational process will now be described below with reference to FIG. 10.

In step S1701, it is determined whether or not DCMODE is 1. If DCMODE is 1, the operational process proceeds to step S1705. If DCMODE is not 1, the operational process proceeds to step S1703. In step S1703 it is determined whether or not DCMODE is 2. If DCMODE is 2, the operational process proceeds to step S1705. If DCMODE is not 2, the operational process ends.

The setting of FCMODE is determined in step S1705. The setting of FCMODE, as shown in FIG. 21, indicates which display data is set according to the FCMODE number. The indication marks 50a–50; which are to be lighted are determined in step S1709 through step S1725.

If FCMODE is 0, the display segment 50a is lighted (step S1707).

If FCMODE is 1, the display segment 50b is lighted (step S1709).

If FCMODE is 2, the display segment 50c is lighted (step S1711).

If FCMODE is 3, the display segment 50d is lighted (step S1713).

Figure 34:
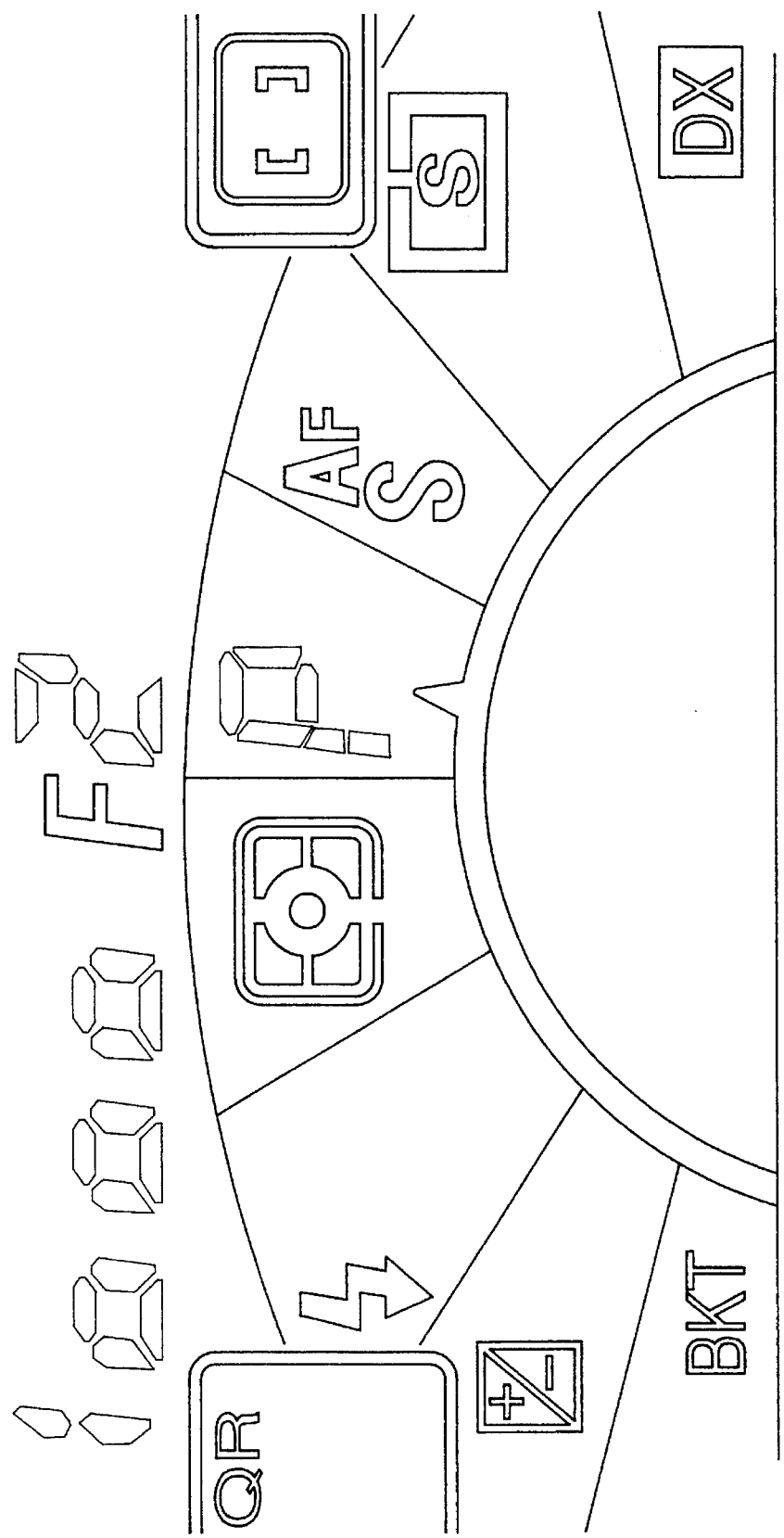
FIG. 34 is an example of a camera display when an exposure mode area has been selected in accordance with embodiments of the present invention.

FIGS. 34, 37 and 40 show an example of the display when FCMODE is 3.

If FCMODE is 4, the display segment 50e lights up (step S1715).

Figure 35:
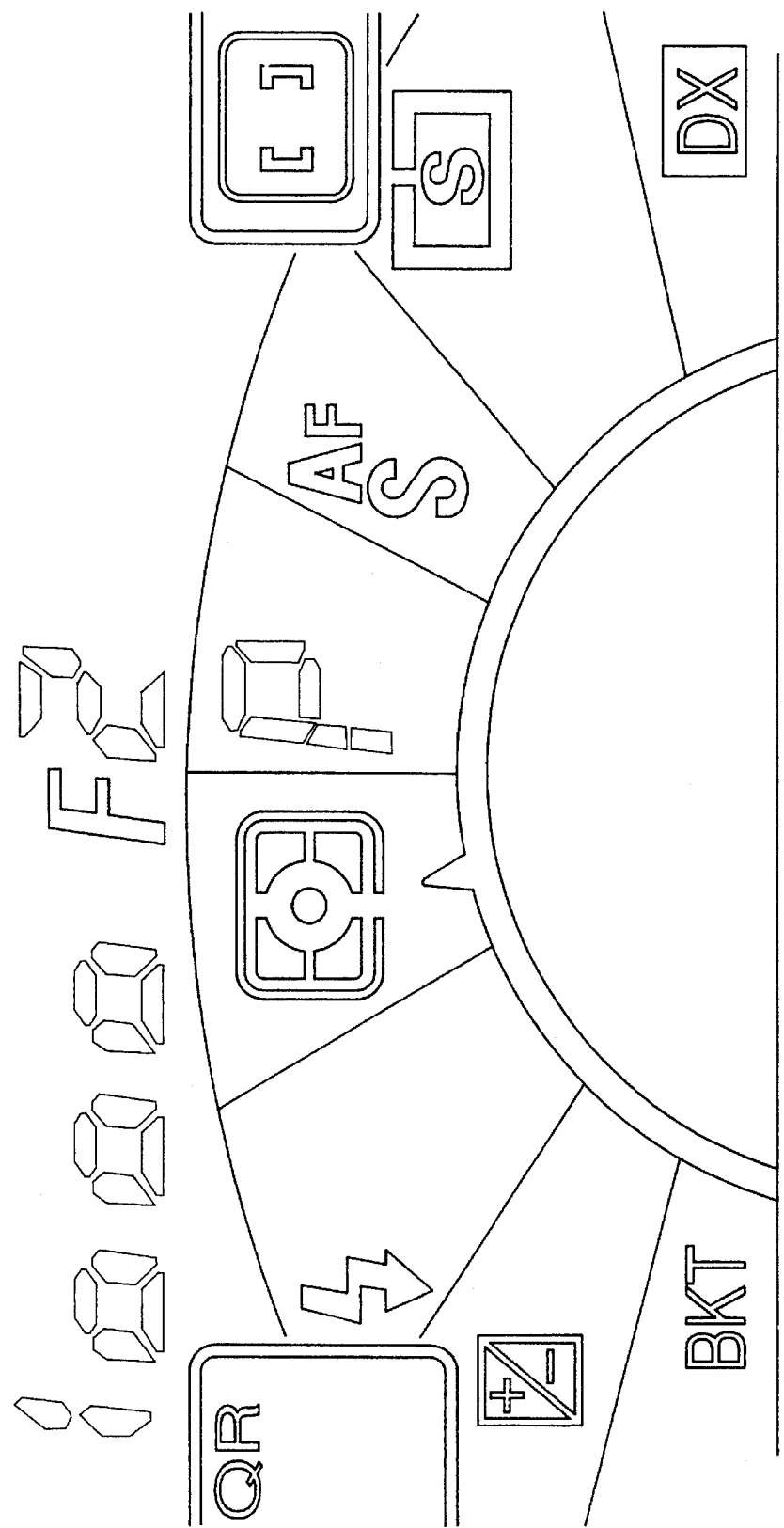
FIG. 35 is an example of a camera display when a photometric mode area has been selected in accordance with embodiments of the present invention.

FIGS. 35, 38 and 41 show an example of the display when FCMODE is 4.

If FCMODE is 5, the display segment 50f is lighted (step S1717).

If FCMODE is 6, the display segment 50g is lighted (step S1719).

If FCMODE is 7, the display segment 50h is lighted (step S1721).

If FCMODE is 8, the display segment 50i is lighted (step S1723).

Figure 36:
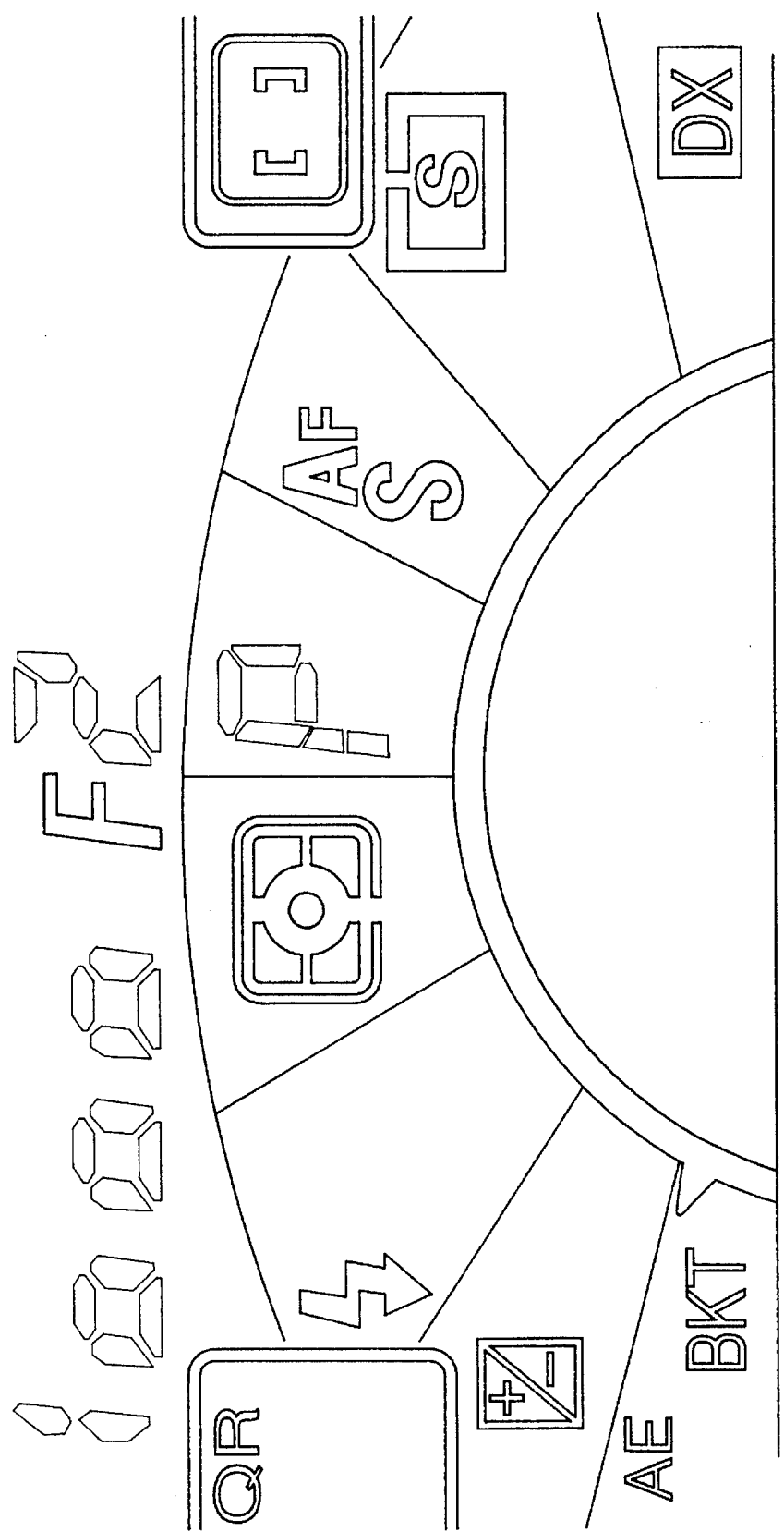
FIG. 36 is an example of a display when an exposure bracketing area of bracketing area has been selected in accordance with embodiments of the present invention.

FIGS. 36, 39 and 42 show an example of the display when FCMODE is 8.

If FCMODE is 9, the display segment 50j is lighted (step S1725).

In step S1707–S1725, after any of the display segments 50 have been lighted, the operational process ends.

The AREA ISOMODE operational process shown in FIG. 11 will now be described.

In step S1801, it is determined whether or not DCMODE is 2. If DCMODE is 2, the operational process proceeds to step S1805. If DCMODE is not 2, the operational process proceeds to step S1803.

In step S1803, it is determined whether or not DCMODE is 3. If DCMODE is 3, the operational process proceeds to step S1805. If DCMODE is not 3, the operational process proceeds to step S1807.

In step S1805, it is determined whether or not FCMODE is 0. If FCMODE is 0, the operational process proceeds to step S1807. If DCMODE is not 0, the operational process ends.

In step S1807, it is determined whether or not ISOMODE is 0. As shown in FIG. 22, the number corresponding to ISOMODE, indicates either automatic setting of film sensitivity data or manual setting.

If ISOMODE is 0, indicating the automatic setting mode, the operational process proceeds to step S1809, and display segment 51b is lighted.

If ISOMODE is not 0, indicating the manual setting mode, the operational process proceeds to step S1809 and, display segment 51a is lighted.

Figure 11:
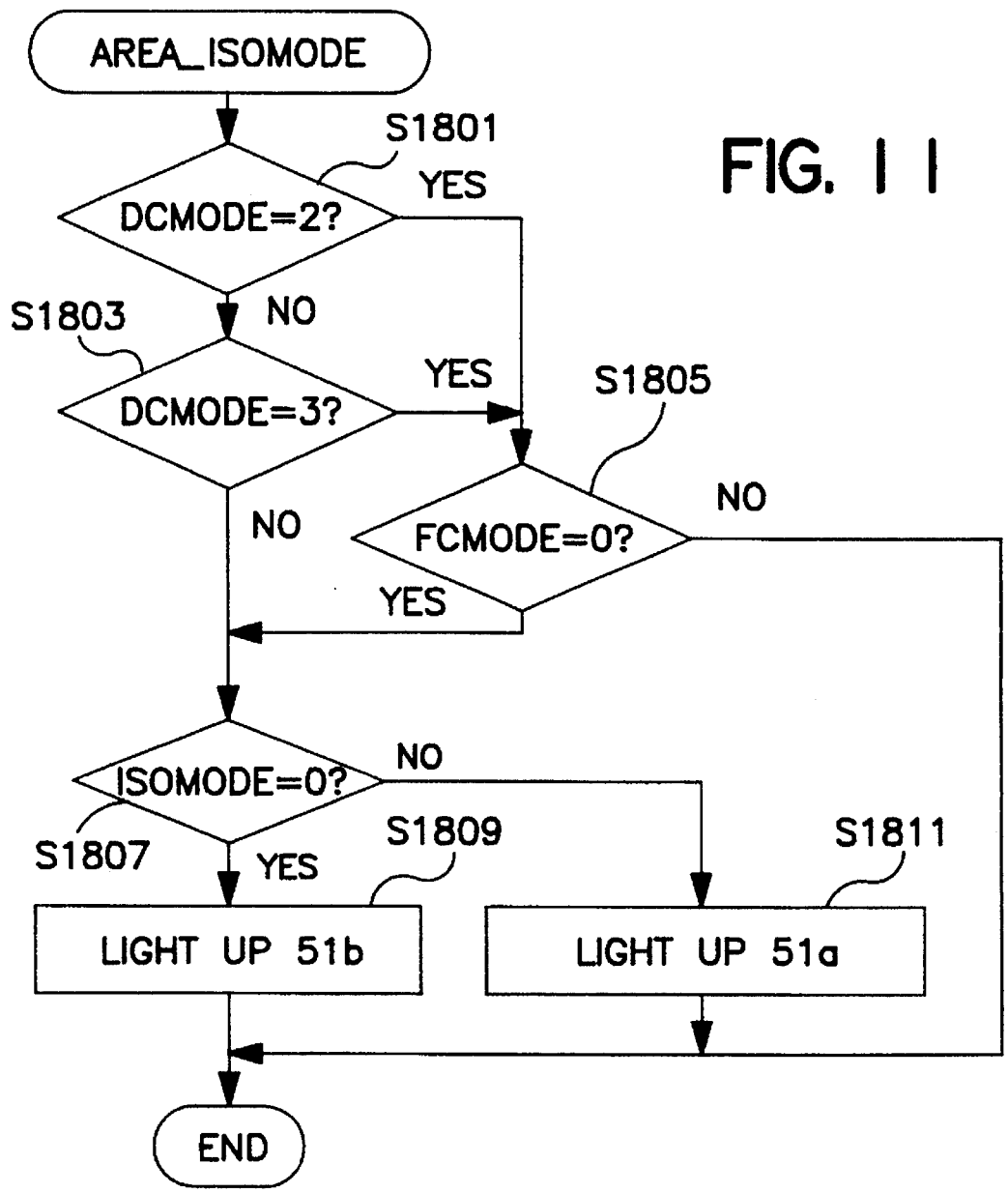
FIG. 11 is a flow chart of a film readout mode area display operational process in accordance with embodiments of the present invention.

In steps S1809–S1811, after any of the display segments have been lighted, the operational process shown in FIG. 11 ends.

The AREA QSMODE operational process shown in FIG. 12 will now be described.

Beginning in step S1901, it is determined whether or not DCMODE is 2. If DCMODE is 2, the operational process proceeds to step S1905. If DCMODE is not 2, the operational process proceeds to step S1903.

In step S1903, it is determined whether or not DCMODE is 3. If DCMODE is 3, the operational process proceeds to step S1905. If DCMODE is not 3, the operational process proceeds to step S1907.

In step S1905, it is determined whether or not FCMODE is 1. If FCMODE is 1, the operational process proceeds to S1907. If FCMODE is not 1, the operational process ends.

The QSMODE setting is determined in step S1907. As shown in the table of FIG. 23, a QSMODE number is set, as shown in FIG. 23, indicates which forwarding mode is set. A forwarding display mark which is lighted is determined according to the QSMODE setting.

If QSMODE is 0, the operational process proceeds to S1909, and display segments 52a and 52b are lighted.

If QSMODE is 1, the operational process proceeds to step S1911, and display segments 52f, 52b and 52c are lighted.

If QSMODE is 2, the operational process proceeds to step S1915, and display segments 52d, 52b and 52c are lighted.

If QSMODE is 3, the operational process proceeds to step S1913, and display segments 52e and 52f are lighted.

Figure 12:
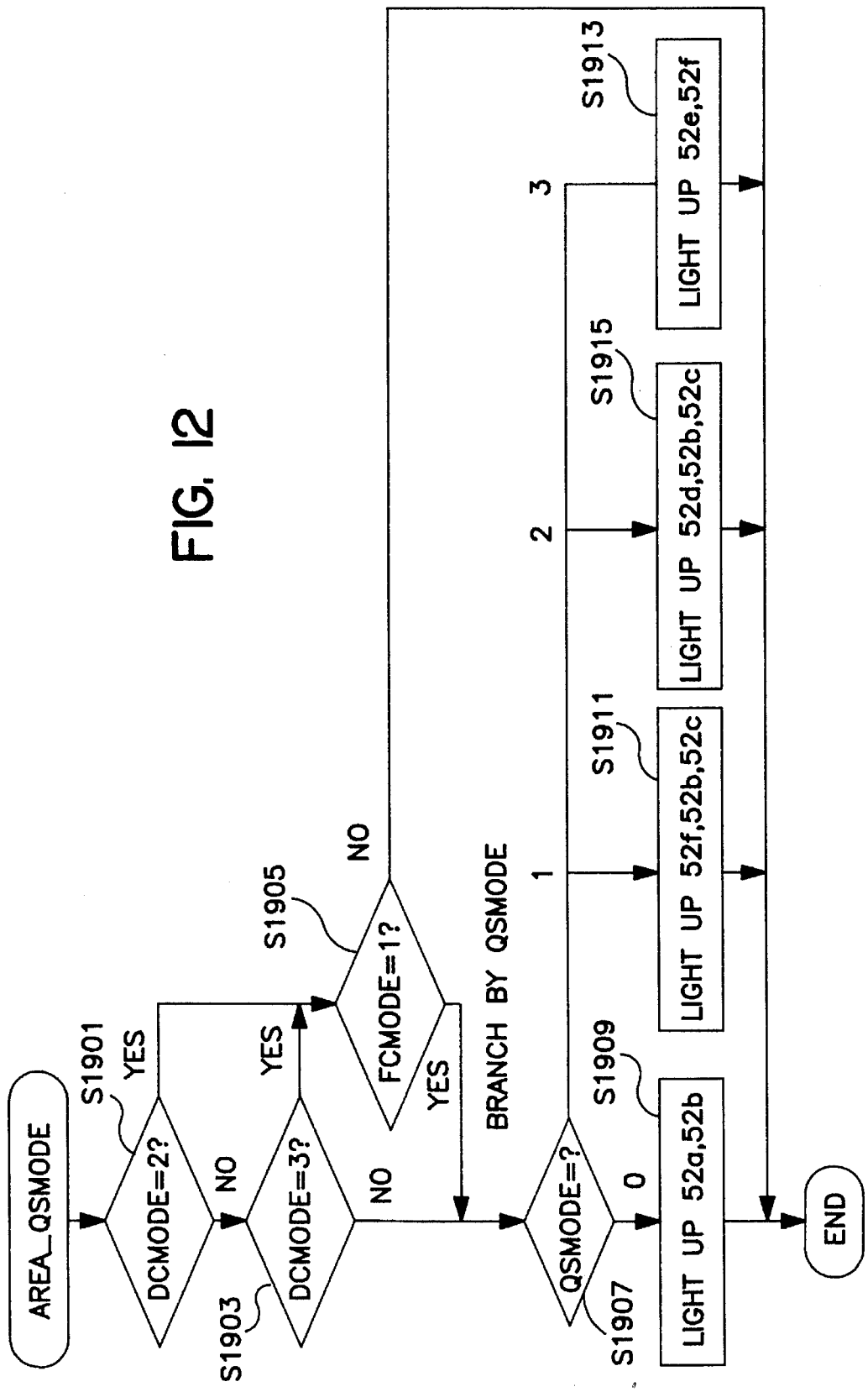
FIG. 12 is a flow chart of a forwarding mode area display operational process in accordance with embodiments of the present invention.

In steps S1909–S1915, after any of the display segments have been lighted, the operational process of FIG. 12 ends.

The AREA AFMODE operational process shown in FIG. 13 will now be described.

Beginning in step S2001, it is determined whether or not DCMODE is 2. If DCMODE is 2, the operational process proceeds to step S2005. If DCMODE is not 2, the operational process proceeds to step S2003.

In step S2003, it is determined whether or not DCMODE is 3. If DCMODE is 3, the operational process proceeds to step S2005. If DCMODE is not 3, the operational process proceeds to step S2007.

In step S2005, it is determined whether or not FCMODE is 2. If FCMODE is 2, the operational process proceeds to step S2007. If FCMODE is not 2, the operational process shown in FIG. 13 ends.

The AFMODE setting is determined in step S2007. As shown in the table of FIG. 24, the AFMODE number indicates which focus adjustment (AF) mode is set. The focus adjustment display mark which is lighted is determined according to the AFMODE setting.

If AFMODE is 0, the operational process proceeds to step S2009, and display segments 53a and 53c are lighted.

If AFMODE is 1, the operational process proceeds to step S2011, and display segments 53a and 53d are lighted.

If AFMODE is 2, the operational process proceeds to step S2013, and display segment 53b is lighted.

Figure 13:
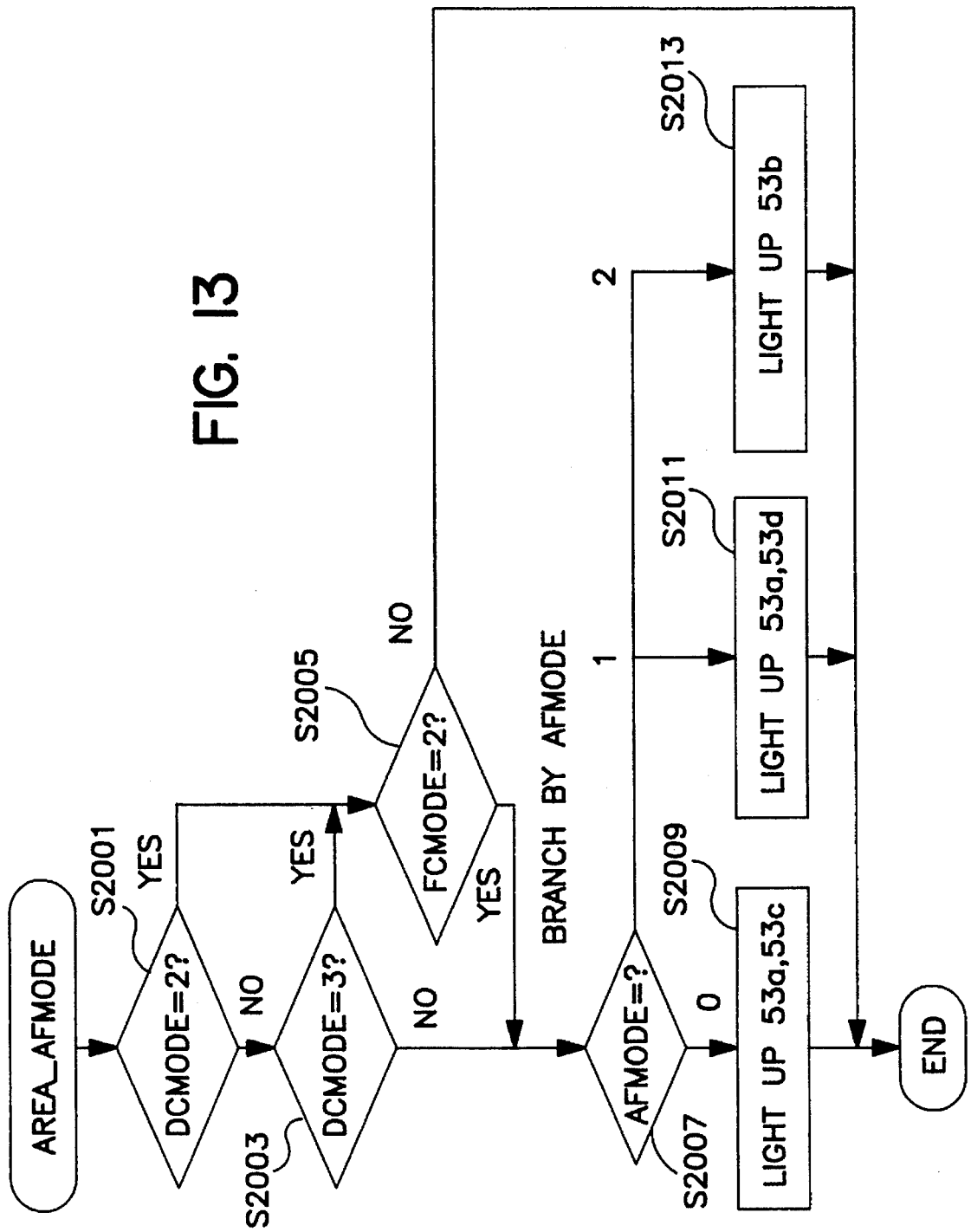
FIG. 13 is a flow chart of an autofocus (AF) mode area display operational process in accordance with embodiments of the present invention.

In steps S2009–S2013, after any of the display segments have been lighted, the operational process of FIG. 13 ends.

The AREA AEMODE operational process shown in FIG. 14 will now be described below.

In step S2101, it is determined whether or not DCMODE is 2. If DCMODE is 2, the operational process proceeds to step S2105. If DCMODE is not 2, the operational process proceeds to step S2103.

In step S2103, it is determined whether or not DCMODE is 3. If DCMODE is 3, the operational process proceeds to step S2105. If DCMODE is not 3, the operational process proceeds to step S2107.

In step S2105, it is determined whether or not FCMODE is 3. If FCMODE is 3, the operational process proceeds to step S2107. If FCMODE is not 3, the operational process of FIG. 14 ends.

The AEMODE setting is determined in step S2107. As shown in FIG. 25, the AEMODE number indicates the exposure control (AE) mode which is set. The exposure control display mark which is lighted is determined according to the AEMODE setting.

If AEMODE is 0, the operational process proceeds to step S2109, and display segments 54a, 54b, 54c, 54d, 54i and 54f are lighted. FIG. 37 shows an example of the display at this time.

If AEMODE is 1, the operational process proceeds to step S2111, and display segments 54a, 54c, 54d, 54f, 54g and 54h are lighted.

If AEMODE is 2, the operational process proceeds to step S2113, and display segments 54a, 54b, 54c, 54d, 54h and 54i are lighted.

If AEMODE is 3, the operational process proceeds to step S2115, and display segments 54a, 54b, 54c, 54e, 54h and 54i are lighted.

Figure 14:
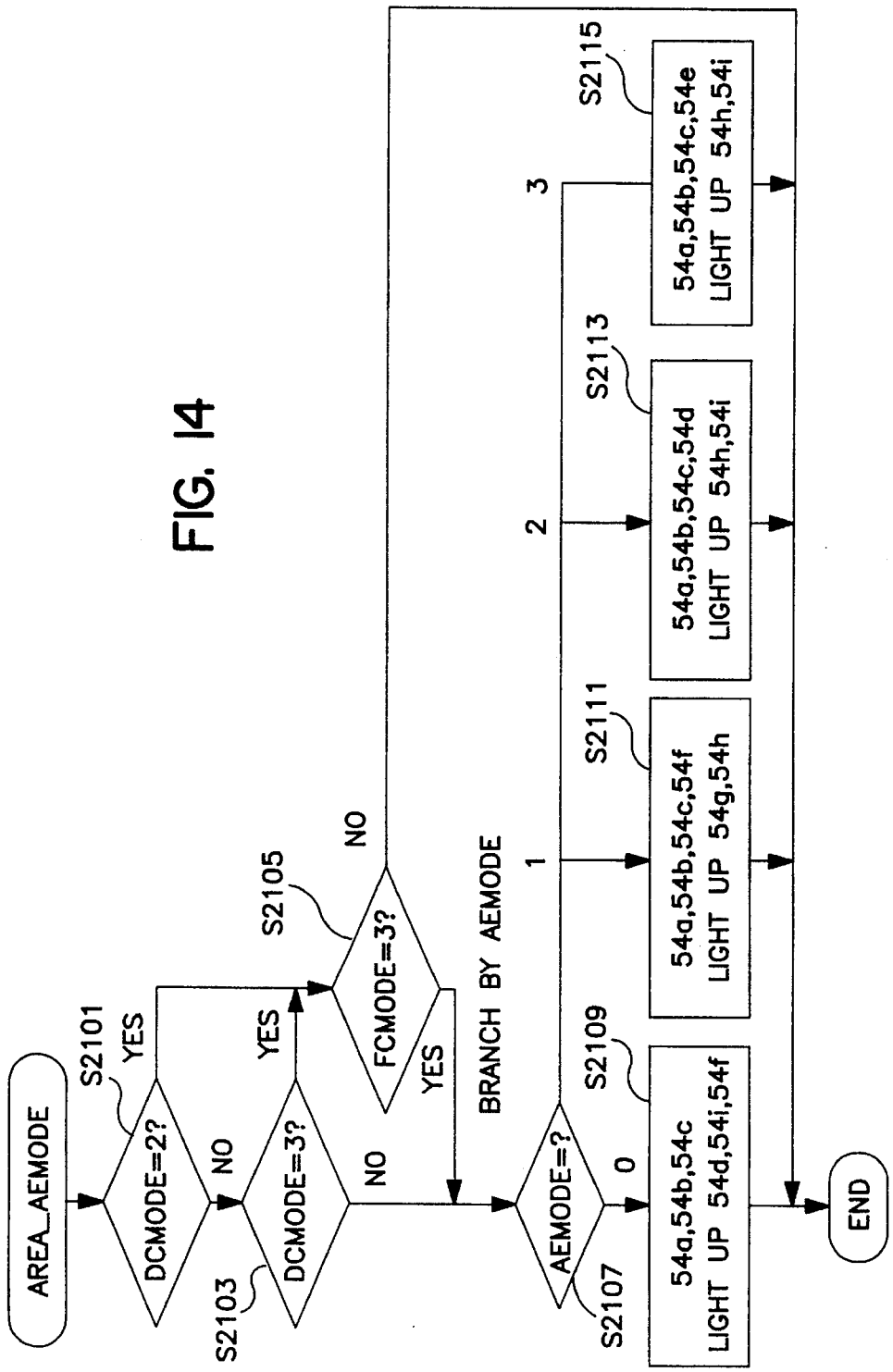
FIG. 14 is a flow chart of an exposure mode display operational process in accordance with embodiments of the present invention.

In steps S2109–S2115, after any of the display segments have been lighted, the operational process shown in FIG. 14 ends.

Figure 15:
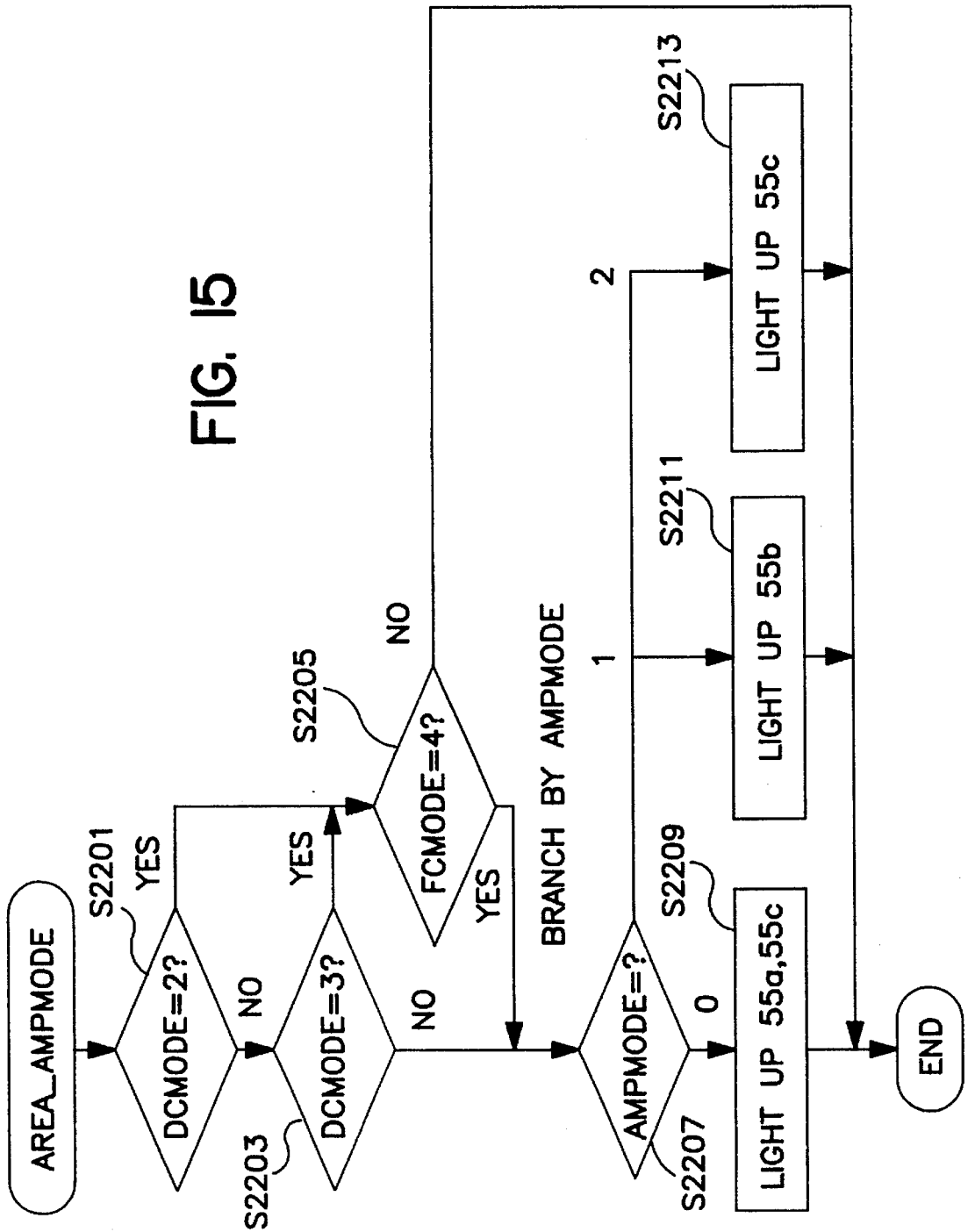
FIG. 15 is a flow chart of a photometric mode display operational process in accordance with embodiments of the present invention.

The AREA AMPMODE operational process shown in FIG. 15 will now be described below.

Beginning in step S2201, it is determined whether or not DCMODE is 2. If DCMODE is 2, the operational process proceeds to step S2205. If DCMODE is not 2, the operational process proceeds to step S2203.

In step S2203, it is determined whether or not DCMODE is 3. If DCMODE is 3, the operational process proceeds to step S2205. If DCMODE is not 3, the operational process proceeds to step S2207.

In step S2205, it is determined whether or not FCMODE is 4. If FCMODE is 4, the operational process proceeds to step S2207. If FCMODE is not 4, operational process ends.

The AMPMODE setting is determined in step S2207. As shown in FIG. 26, the AMPMODE setting indicates a photometric control mode which is set. The photometric control display mark which is lighted is determined according to the AMPMODE setting.

If AMPMODE is 0, the operational process proceeds to step S2209, and display segments 55a and 55c are lighted. FIG. 38 shows an example of the display at this time.

If AMPMODE is 1, the operational process proceeds to S2211, and the display segment 55b is lighted. FIG. 41 shows an example of the display at this time.

If AMPMODE is 2, the operational process proceeds to step S2213, and the display segment 55c is lighted.

In steps S2209–S2213, after any of the display segments have been lighted, the operational process ends.

Figure 16:
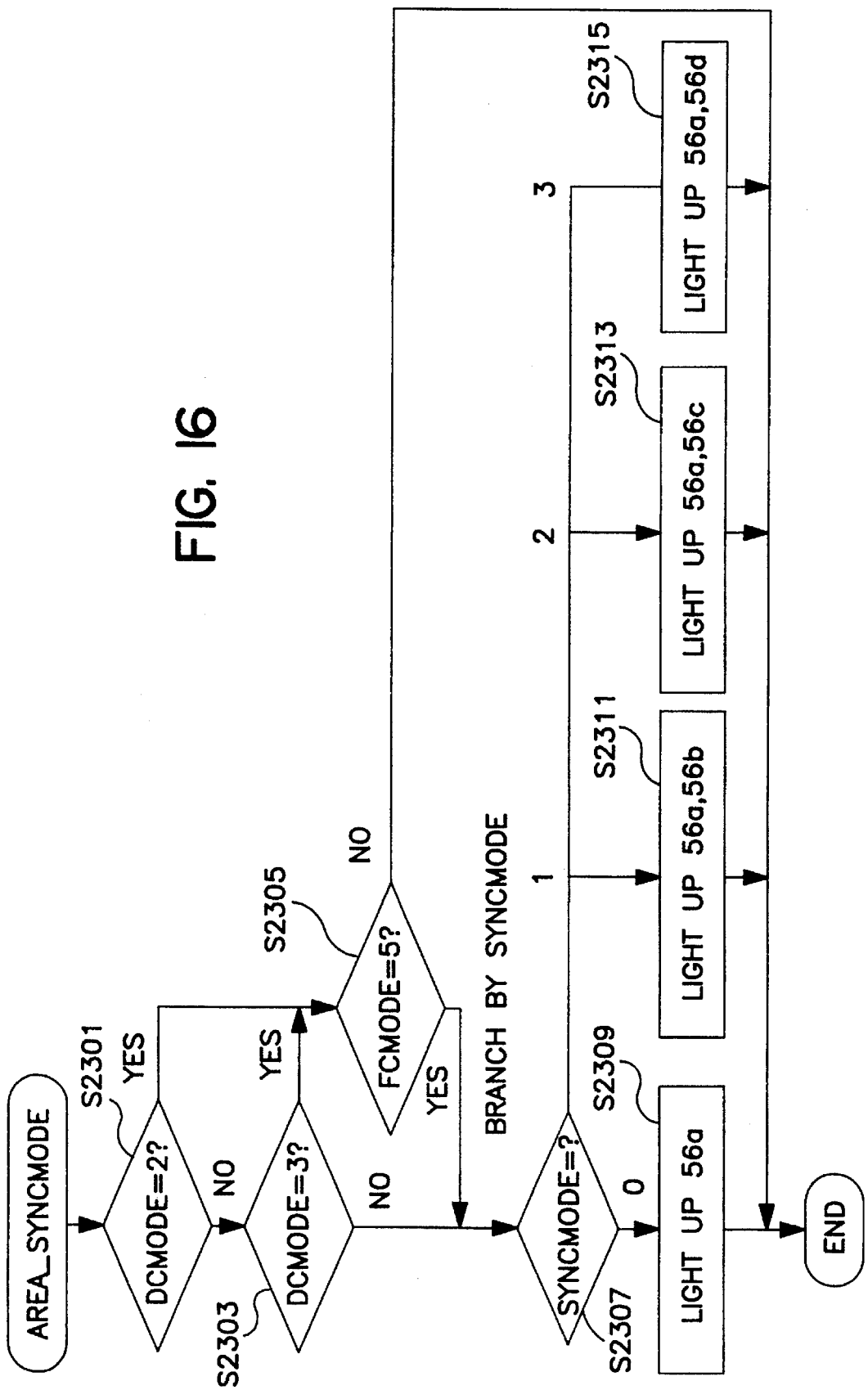
FIG. 16 is a flow chart of a synchro mode display operational process in accordance with embodiments of the present invention.

The AREA SYNCMODE operational process shown in FIG. 16 will now be described below.

In step S2301, it is determined whether or not DCMODE is 2. If DCMODE is 2, the operational process proceeds to S2305. If DCMODE is not 2, the operational process proceeds to step S2303.

In step S2303, it is determined whether or not DCMODE is 3. If DCMODE is 3, the operational process proceeds to step S2305. If DCMODE is not 3, the operational process proceeds to step S2307.

In step S2305, it is determined whether or not FCMODE is 5. If FCMODE is 5, the operational process proceeds to step S2307. If FCMODE is not 5, the operational process ends.

The SYNCMODE setting is set is determined in step S2307. As shown in the table of FIG. 27, the SYNCMODE setting indicates which speed light generation control mode is set. A speed light generation control display mark which is lighted is determined according to the setting of SYNCMODE.

If SYNCMODE is 0, the operational process proceeds to step S2309, and display segment 56a is lighted.

If SYNCMODE is 1, the operational process proceeds to step S2311, and display segments 56a and 56b are lighted.

If SYNCMODE is 2, the operational process proceeds to step S2313, and display segments 56a and 56c are lighted.

If SYNCMODE is 3, the operational process proceeds to step S2315, and display segments 56a and 56d are lighted.

In steps S2309–S2315, after any of the display segments have been lighted, the operational process ends.

Figure 17:
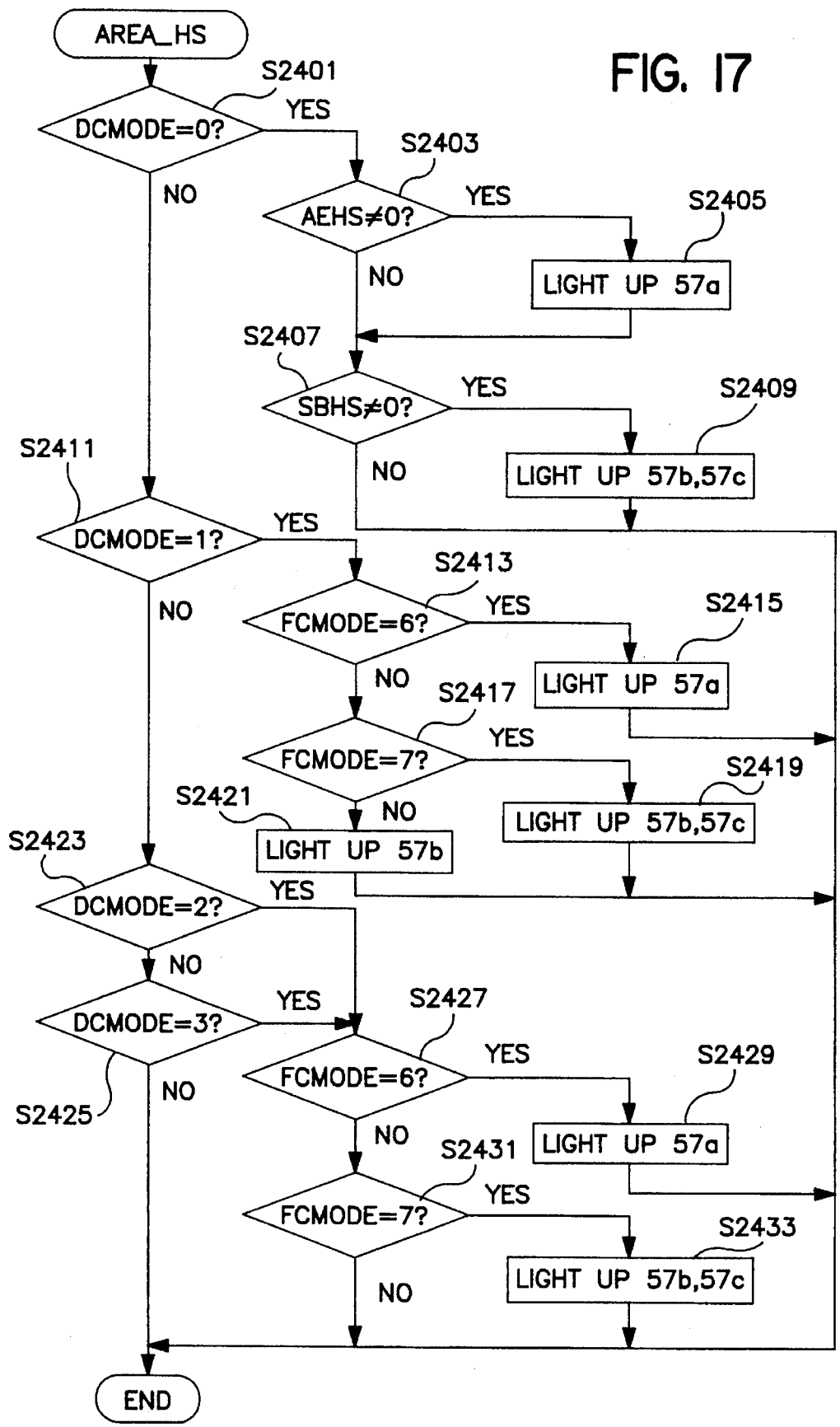
FIG. 17 is a flow chart of a correction area display operational process in accordance with embodiments of the present invention.

The AREA HS operational process of FIG. 17 will now be described.

Beginning in step S2401, it is determined whether or not DCMODE is 0. If DCMODE is 0, the operational process proceeds to step S2403. If DCMODE is not 0, the operational process proceeds to step S2411.

In step S2403, it is determined whether or not AEHS is 0. If AEHS is not 0, the operational process proceeds to step S2405, display segment 57a is lighted and the operational process proceeds to step S2407. When AEHS is 0, the operational process proceeds to step S2407. As shown in FIG. 28, the AEHS setting indicates the amplitude of the set exposure correction amount.

In step S2407, it is determined whether or not SBHS is 0. If SBHS is not 0, the operational process proceeds to step S2409, and display segments 57b and 57c are lighted. When SBHS is 0, the operational process ends. As shown in FIG. 29, the SBHS setting indicates the setting of the correction amplitude of the speed light generation amount.

In step S2411, it is determined whether or not DCMODE is 1. If DCMODE is 1, the operational process proceeds to step S2413. If DCMODE is not 1, the operational process proceeds to step S2423.

In step S2417, it is determined whether or not FCMODE is 7. If FCMODE is 7, the operational process proceeds to step S2419, display segments 57b and 57c are lighted, and the operational process ends. When FCMODE is not 7, the operational process proceeds to step S2421, display segment 57b is lighted and the operational process ends.

In step S2423, it is determined whether or not DCMODE is 2. If DCMODE is 2, the operational process proceeds to step S2427. If DCMODE is not 2, the operational process proceeds to step S2425.

In step S2425, it is determined whether or not DCMODE is 3. If DCMODE is 3, the operational process proceeds to step S2427. If DCMODE is not 3, the operational process ends.

In step S2427, it is determined whether or not FCMODE is 6. If FCMODE is 6, the operational process proceeds to step S2429, display segment 57a is lighted, and the operational process ends. If FCMODE is not 6, the operational process proceeds to step S2431.

In step S2431, it is determined whether or not FCMODE is 7. If FCMODE is 7, the operational process proceeds to step S2433, display segments 57b and 57c are lighted, and the operational process ends. When FCMODE is not 7, the operational process ends.

Figure 18:
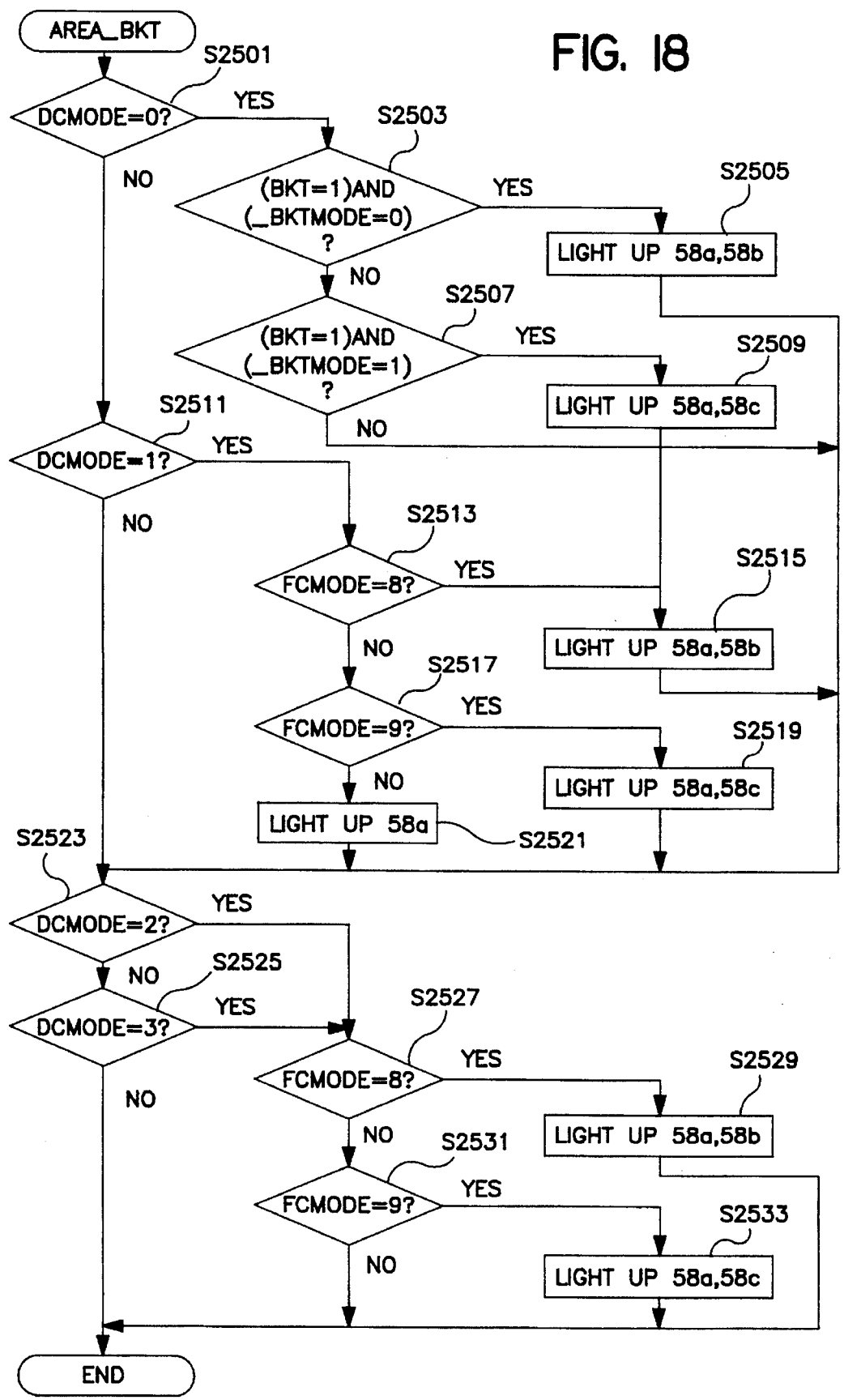
FIG. 18 is a flow chart of a bracketing area display operational process in accordance with embodiments of the present invention.

The AREA BKT operational process of FIG. 18 will now be described below.

Beginning is step S2501, it is determined whether or not DCMODE is 0. If DCMODE is 0, the operational process proceeds to step S2503. If DCMODE is not 0, the operational process proceeds to step S2511.

In step S2503, it is determined whether or not BKT is 1 and BKT MODE is 0. If step S2503 is affirmative, the operational process proceeds to step S2505, display segments 58a and 58b are lighted, and the operational process proceeds to step S2517. If step S2503 is negative, the operational process proceeds to step S2507. The table of FIG. 30 indicates setting of BKT and BKTMODE.

In step S2507, it is determined whether or not BKT is 1 and BKT MODE is 1. If step S2507 is affirmative, display segments 58a and 58c are lighted (step S2509), and the operational process proceeds to step S2523.

In step S2511, it is determined whether or not DCMODE is 1. If DCMODE is 1, the operational process proceeds to step S2513. If DCMODE is not 1, the operational process proceeds to step S2523.

In step S2513, it is determined whether or not FCMODE is 8. If FCMODE is 8, the operational process proceeds to step S2515, display segments 58a and 58b are lighted, and the operational process proceeds to step S2523. When FCMODE is not 8, the operational process proceeds to step S2523.

In step S2517, it is determined whether or not FCMODE is 9. If FCMODE is 9, the operational process proceeds to step S2519, display segments 58a and 58c are lighted, and the operational process proceeds to step S2523. When FCMODE is not 9, the operational process proceeds to step S2521, display segment 57b is lighted, and the operational process proceeds to step S2523.

In step S2523, it is determined whether or not DCMODE is 2. If DCMODE is 2, the operational process proceeds to step S2527. If DCMODE is not 2, the operational process proceeds to step S2525.

In step S2525, it is determined whether or not DCMODE is 3. If DCMODE is 3, the operational process proceeds to step S2527. If DCMODE is not 3, the operation process ends.

In step S2527, it is determined whether or not FCMODE is 8. If FCMODE is 8, the operational process proceeds to step S2529, display segments 58a and 58b are lighted, and the operational process ends. FIGS. 39 and 42 show an example of a display at this time. When FCMODE is not 8, the operational process proceeds to step S2531.

In step S2531, it is determined whether or not FCMODE is 9. If FCMODE is 9, the operational process proceeds to step S2533, display segments 58a and 58c are lighted, and the operational process ends. When FCMODE is not 9, the operational process ends.

In accordance with embodiments of the present invention, it is possible to perform many setting operations with a reduced number of operating members. Further, by locating the display of frequently used functions in the center of a display and less frequently used functions at the periphery of the display, operability is improved. Furthermore, because the user normally observes the same display device, data can be obtained in a centralized manner. Moreover, because there is uniformity in operation, the setting operations can be concentrated in a reduced number of operating members.

In accordance embodiments of the present invention, alterations of set data, such as the addition of the set data can be easily performed. Furthermore, when no alteration of data is effected directly after a setting operation has been performed, or when it is desired to repeat setting of the same data, it is possible to immediately return to a former setting by pressing one button, thus improving ease of operation.

Still further, in accordance with embodiments of the present invention, during the setting of bracketing, no specially disposed separate operating members are required, and the setting of repeated bracketing becomes possible with fewer operations.

Furthermore, in accordance with embodiments of the present invention, when a speed light is not used, because data setting is inhibited in the area of light regulation correction and light regulation bracketing, and moreover, new light regulation corrections and new light regulation bracketing in the setting area are inhibited, the user can dispense with ineffective operations. Accordingly, photography can be performed with good efficiency of the setting operations.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A setting device to set camera data, comprising:

a first operating member;

a first setting input device which is switched ON when the first operating member is operated;

a second operating member;

a second setting input device which is switched ON when the second operating member is operated;

a third operating member;

a third setting input device which outputs a signal according to an operation of the third operating member;

a first memory to store first setting data;

a second memory to store second setting data;

a third memory to store one of a first state which selects the first setting data and a second state which selects the second setting data;

a first display to display one of the first and second setting data according to the state stored by the third memory;

a second display to display one of the first setting data stored in the first memory and the second setting data stored in the second memory according to the content of the third memory;

a first control unit to change a state stored in the third memory according to an output signal of the third setting input device when the first setting input device is ON;

a second control unit to change the content of the first memory, when the third memory stores the first state, according to the output signal of the third setting device when the second setting input device is ON; and a third control unit to change the content of the second memory, when the third memory stores the second state, according to the output signal of the third setting device when the second setting input device is ON.

2. A camera having a setting device to set camera data, comprising:

a first operating member;

a first setting input device which is switched ON when the first operating member is operated;

a second setting input device which is switched ON when the second operating member is operated;

a third operating member;

a third setting input device which outputs a signal according to an operation of the third operating member;

a first memory to store first setting data;

a second memory to store second setting data;

a third memory to store one of a first state which selects the first setting data and a second state which selects the second setting data;

a first display to display one of the first and second setting data selected according to the state stored by the third memory;

a second display to display one of the first setting data stored in the first memory and the second setting data stored in the second memory according to the state stored by the third memory;

a fourth memory having first, second, third and fourth memory states;

a first control device which, when the fourth memory is in the first memory state, changes the content of the fourth memory to the second memory state when the first setting input device is ON, and when the fourth memory is in the second memory state, changes the content of the fourth memory to the third memory state when the first setting input device is OFF, and when the fourth memory is in one of the second memory state and the third memory state, changes the content of the fourth memory to the fourth memory state when the second setting input device is ON, and when the fourth memory is in the fourth memory state, and the second setting input device is OFF, changes the content of the fourth memory to the first memory state; and a second control device which, when the fourth memory is in the second memory state, changes the content of the third memory according to the output of the third setting input device, and when the fourth memory is in the fourth state, changes the content of the first memory when the third memory is in the first setting state, and causes the content of the second memory to change when the third memory is in the second setting state.

3. A data setting device as recited in claim 2, further comprising:

a timer to time a predetermined time from when the fourth memory changes from the fourth memory state to the first memory state; and a third control device which sets the fourth memory to the fourth memory state when the second setting input device is ON and the timer is timing.

4. A data setting device as recited in claim 2, further comprising:

a flash generation device;

an inhibiting device; and a flash generation device control, wherein
the first setting data is light regulation correction data of the flash generation device, and
the inhibiting device makes the light regulation correction data invalid, and inhibits the change of the third memory to the first memory state when the flash generation device is not able to generate light.

5. A data setting device as recited in claim 2, further comprising:

a flash generation device;

an inhibiting device; and a flash generation device control, wherein
the first setting data is light regulation bracketing data of a flash generation device, and
the inhibiting device makes the second bracketing setting invalid and inhibits the change of the third memory to the first memory state when the flash generation device is not able to generate light.

* * * * *